US009045058B2

(12) United States Patent
Katoh et al.

(10) Patent No.: US 9,045,058 B2
(45) Date of Patent: Jun. 2, 2015

(54) VEHICLE SEAT APPARATUS

(75) Inventors: Kohshi Katoh, Hadano (JP); Eishi Takeuchi, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/238,075

(22) PCT Filed: Aug. 10, 2011

(86) PCT No.: PCT/JP2011/068326
§ 371 (c)(1),
(2), (4) Date: Feb. 10, 2014

(87) PCT Pub. No.: WO2013/021497
PCT Pub. Date: Feb. 14, 2013

(65) Prior Publication Data
US 2014/0191550 A1    Jul. 10, 2014

(51) Int. Cl.
*B60N 2/02* (2006.01)
*B60N 2/48* (2006.01)
*B60N 2/64* (2006.01)
*B60N 2/06* (2006.01)
*B60N 2/22* (2006.01)
*B60N 2/39* (2006.01)

(52) U.S. Cl.
CPC .. *B60N 2/02* (2013.01); *B60N 2/48* (2013.01); *B60N 2/64* (2013.01); *B60N 2/06* (2013.01); *B60N 2/22* (2013.01); *B60N 2002/0208* (2013.01); *B60N 2/39* (2013.01); *B60N 2002/0212* (2013.01); *B60N 2002/022* (2013.01)

(58) Field of Classification Search
CPC ............. A47C 1/023; B60N 2/02; B60N 2/39
USPC ............................. 297/314, 337, 338, 354.11
See application file for complete search history.

(56) References Cited

U.S. PATENT DOCUMENTS

| | | | | |
|---|---|---|---|---|
| 5,588,704 | A | * | 12/1996 | Harza ............................ 297/314 |
| 5,769,492 | A | * | 6/1998 | Jensen ........................... 297/314 |
| 8,662,585 | B2 | * | 3/2014 | Garvis et al. .................. 297/314 |
| 2007/0203628 | A1 | | 8/2007 | Yoshida et al. |
| 2008/0097254 | A1 | * | 4/2008 | Torres et al. ..................... 601/23 |
| 2010/0117427 | A1 | * | 5/2010 | Fukuyama et al. ........... 297/338 |

FOREIGN PATENT DOCUMENTS

| | | | | |
|---|---|---|---|---|
| DE | 2851129 | * | 6/1980 | ............... B60N 2/02 |
| GB | 2 313 214 | A | 11/1997 | |
| JP | 3-25035 | A | 2/1991 | |
| JP | 2001-277913 | A | 10/2001 | |
| JP | 2007-223490 | A | 9/2007 | |

(Continued)

OTHER PUBLICATIONS

International Search Report of PCT/JP2011/068326, dated Nov. 8, 2011.

*Primary Examiner* — Laurie Cranmer
(74) *Attorney, Agent, or Firm* — Sughrue Mion, PLLC

(57) ABSTRACT

A vehicle seat apparatus includes a seat unit supporting mechanism rotatably supporting a seat unit about a rotation axis in a roll direction of a vehicle and a yaw direction of the vehicle. The rotation axis is set so that a rear side is higher than a front side in a longitudinal direction of the vehicle seat apparatus, and so as to pass near a waist of a driver sitting on the vehicle seat apparatus.

17 Claims, 17 Drawing Sheets

(56) References Cited

FOREIGN PATENT DOCUMENTS

| JP | 2008-44418 A | 2/2008 |
| JP | 2008-302795 A | 12/2008 |
| JP | 2009-286153 A | 12/2009 |
| JP | 2010-29459 A | 2/2010 |
| JP | 2010-188881 A | 9/2010 |
| JP | 2011-51490 A | 3/2011 |
| WO | 95/02521 | 1/1995 |

* cited by examiner

Fig.1
(a) 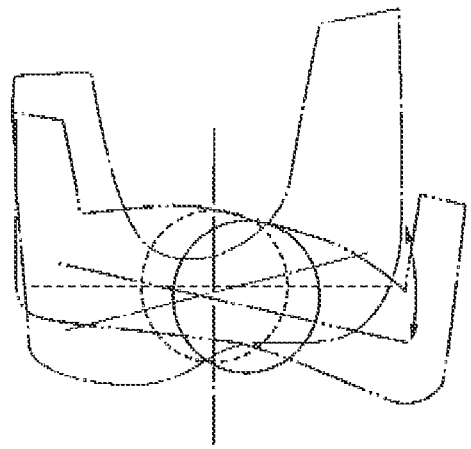
(b) 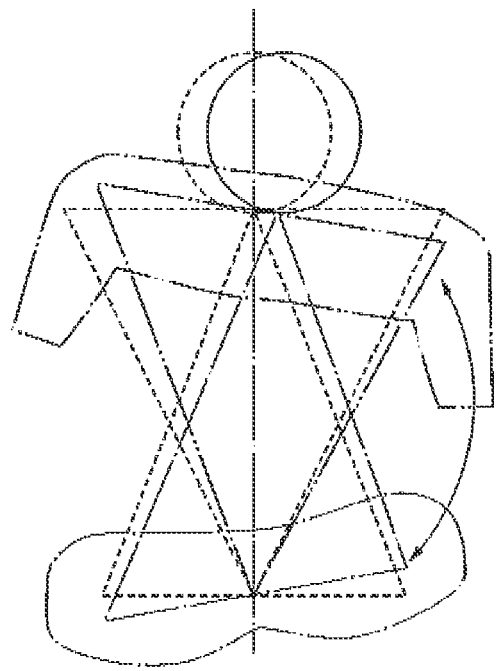

Fig.2
(a) 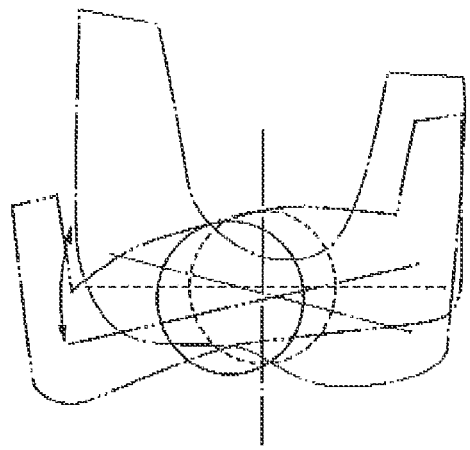
(b) 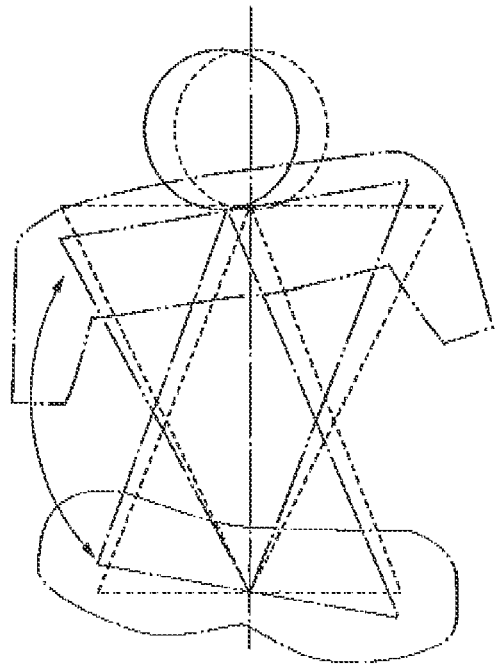

VEHICLE SEAT APPARATUS

CROSS REFERENCE TO RELATED APPLICATIONS

This application is a National Stage of International Application No. PCT/JP2011/068326 filed Aug. 10, 2011, the contents of all of which are incorporated herein by reference in their entirety.

TECHNICAL FIELD

The present invention relates to a vehicle seat apparatus having a seat unit and a seat backrest.

BACKGROUND ART

In the related art, as a vehicle seat apparatus, there is one disclosed in Patent Literature 1. In a technology disclosed in Patent Literature 1, an instrument panel module with an attached steering wheel and a vehicle seat are fixed to a movable floor which is movable by an actuator. Then, the technology calculates a traveling direction of a vehicle based on a steering angle of a steering wheel, drives the actuator and rotates the movable floor so that the vehicle seat faces the traveling direction.

CITATION LIST

Patent Literature

[Patent Literature 1] Japanese Unexamined Patent Application No. 2011-051490

SUMMARY OF INVENTION

Technical Problem

However, the technology disclosed in Patent Literature 1 does not take into account a body movement of an occupant performing a steering operation. Therefore, there is room for improvement in steering operability or posture retention during turning.

Accordingly, the present invention aims to provide a vehicle seat apparatus capable of facilitating the posture retention of the occupant during the turning.

Solution to Problem

The present inventors have reached the following findings as a result of intensive studies to solve the above problems.

It has been known that most human movements start from a waist and additionally a more comfortable and effective movement can be performed by moving the waist in various directions. For example, it is possible to run comfortably and fast if the waist is bent and pivoted to move hips and shoulder blades in opposite directions. In addition, for example, even in Karate, if the waist is bent and pivoted to move the hips and the shoulder blades in the opposite directions, it is possible to throw a speedy and powerful punch.

However, since a driver sits on a seat fixed to a vehicle, the waist of the driver is always in a fixed state. Therefore, the driver has to perform a driving operation in a state where the waist from which a natural movement starts is in the fixed state.

For example, during a steering operation, since the driver cannot move the hips and the shoulder blades in the opposite directions starting from the waist, the driver has to perform a rotary operation of a steering wheel only by using his or her arm's muscle strength. However, since the arm's muscle is smaller than a trunk muscle of the waist and has weaker physical endurance, if the rotary operation of the steering wheel is performed only by using the arm's muscle strength, the arm is easily fatigued Moreover, unlike the natural movement starting from the waist, the arm's movement is performed in an unnatural posture of the fixed waist. Thus, shoulders and a neck are easily fatigued.

In addition, since the waist is fixed so that the trunk muscle has less strength, stiffness is laterally very weak. Therefore, in order for the driver to withstand a lateral force facing outward from a turning direction of the vehicle, the driver has to rely on side supports of the seat. This leads to an increase in weight and size of the seat.

In addition, if the state of the fixed waist is continued for a long time, the trunk muscle of the waist is greatly weakened to cause backache. Three major diseases of taxi drivers is the backache, hemorrhoids and stomach ulcers. It is said that the reason is because of the weakened muscle strength of the trunk muscle resulting from driving the vehicle for a long time.

For this reason, the present inventors have reached the finding that the above problems can be solved by allowing a seat unit of the vehicle seat apparatus to be movable.

That is, a vehicle seat apparatus according to the present invention includes a seat unit; a seat backrest arranged on a rear side of the seat unit; and seat unit supporting means for supporting the seat unit so that a right side and a left side of the seat unit move relatively in a vertical direction of the vehicle seat apparatus.

According to the vehicle seat apparatus of the invention, the occupant can bend a lumbar spine in a lateral direction and can move the right side and the left side of the hips relatively in the vertical direction of the vehicle seat apparatus. This enables the occupant to consciously or unconsciously adopt a posture capable of performing a comfortable steering operation or a posture excellent in the posture retention during the turning. Therefore, it is possible to improve the posture retention of the occupant.

For example, when performing the steering operation, the occupant can bend the lumbar spine in the lateral direction and can move the inside of the hip in the turning direction of the vehicle relatively upward in the vertical direction of the vehicle seat apparatus with respect to the outer side hip in the turning direction of the vehicle. This motion is an optimum motion when viewed from the law of conservation of angular momentum between the hips and the shoulders, thereby improving steering operability of the occupant. Moreover, since the occupant moves the hips by bending the vertebrae in the lateral direction in this manner, the occupant can rotate the steering wheel by using not only the arm's muscle but also the trunk muscle which has the physical endurance stronger than the arm's muscle. Accordingly, fatigue of the muscles of the arms, the shoulders and the neck caused by the steering operation is lessened, thereby enabling the comfortable steering operation.

In addition, even while the vehicle is turning, the occupant can bend the lumbar spine in the lateral direction and can maintain the posture of the moved hips. Therefore, the occupant extends the trunk side muscle outside of the vehicle turning direction and contracts the trunk side muscle inside of the vehicle turning direction, thereby improving the lateral stiffness. Accordingly, even without depending on a large side support, the occupant can withstand the lateral force acting outward in the vehicle turning direction. Therefore, it is possible to obtain a lightweight and compact seat.

In addition, since the occupant can perform a movement of the waist for moving the hips by using the trunk muscle during every steering operation, the occupant can perform the movement of the waist even during the driving of the vehicle. Since this suppresses the trunk muscle from being weakened, it is possible to suppress diseases such as backache due to the weakened trunk muscle. In addition, since blood circulation is promoted around the waist, it is possible to suppress the diseases such as weakened viscera function due to poor blood circulation around the waist. For these reasons, it is possible to achieve health promotion by driving the vehicle.

In the present invention, the seat unit supporting means may rotatably support the seat unit in the roll direction of the vehicle.

In this manner, it is possible to naturally move the hips of the occupant during the steering operation by rotatably supporting the seat unit in the roll direction of the vehicle. Accordingly, it is possible to ensure a smooth movement of the waist which uses the trunk muscle and moves the hips.

In the present invention, the seat unit supporting means may support the seat unit so that the right side and the left side of the seat unit are moved relatively in the longitudinal direction of the vehicle seat apparatus.

In this manner, the occupant can twist the lumbar spine and move the right side and the left side of the hips relatively in the longitudinal direction of the vehicle seat apparatus. This enables the occupant to consciously or unconsciously adopt a posture capable of performing a comfortable steering operation or a posture excellent in the posture retention during the turning. Therefore, it is possible to further improve the posture retention of the occupant.

For example, when performing the steering operation, the occupant can twist the lumbar spine and move the hip inside of the vehicle turning direction forward in the longitudinal direction of the vehicle seat apparatus with respect to the hip outside of the vehicle turning direction. This motion is an optimum motion when viewed from the law of conservation of angular momentum between the hips and the shoulders, thereby further improving steering operability of a driver.

In the present invention, the seat unit supporting means may rotatably support the seat unit in the yaw direction of the vehicle.

In this manner, it is possible to naturally move the hips of the occupant during the steering operation by rotatably supporting the seat unit in the yaw direction of the vehicle. Accordingly, it is possible to ensure a smooth movement of the waist which uses the trunk muscle and moves the hips.

In the present invention, a rotation axis of the seat unit using the seat unit supporting means may be set so that a rear side is higher than a front side in the longitudinal direction of the vehicle seat apparatus.

Since the human lumbar spine is tilted rearward, if the rotation axis of the seat unit is set so that the rear side is higher than the front side in the longitudinal direction of the vehicle seat apparatus, bending of the lumbar spine or twisting of the lumbar spine is facilitated. Accordingly, it is possible to further improve the steering operability of the occupant.

In the present invention, the rotation axis of the seat unit using the seat unit supporting means may pass near the waist of the occupant.

Since the waist is frequently moved mainly around the lumbar spine, if the rotation axis of the seat unit passes near the waist of the occupant, the bending of the lumbar spine or the twisting of the lumbar spine is further facilitated. Accordingly, it is possible to further improve the steering operability of the occupant.

The present invention may further include seat backrest supporting means for supporting the seat backrest so that the right side and the left side of the seat backrest are moved relatively in the vertical direction of the vehicle seat apparatus.

In this manner, the occupant can bend the lumbar spine in a lateral direction and move the right side and the left side of the shoulder blades relatively in the vertical direction of the vehicle seat apparatus. This enables the occupant to consciously or unconsciously adopt the posture capable of performing the comfortable steering operation or the posture excellent in the posture retention during the turning. Therefore, it is possible to further improve the posture retention of the occupant.

In the present invention, the seat backrest supporting means may rotatably support the seat backrest in the roll direction of the vehicle.

In this manner, it is possible to naturally move the shoulder blades of the occupant during the steering operation by rotatably supporting the seat backrest in the roll direction of the vehicle. Accordingly, it is possible to ensure a smooth movement of the waist which uses the trunk muscle and moves the shoulder blades.

In the present invention, the seat backrest supporting means may support the seat backrest so that the right side and the left side of the seat backrest move relatively in the longitudinal direction of the vehicle seat apparatus, and the vehicle seat apparatus may further include movement direction regulating means for rotating the seat unit and the seat backrest in opposite directions in a top view.

In this manner, the occupant can twist the lumbar spine and move the right side and the left side of the shoulder blades relatively in the longitudinal direction of the vehicle seat apparatus. This enables the occupant to consciously or unconsciously adopt the posture capable of performing the comfortable steering operation or the posture excellent in the posture retention during the turning.

Moreover, the occupant can always rotate the hips and the shoulders in the opposite directions in the yaw direction of the vehicle. This posture is an optimum motion when viewed from the law of conservation of angular momentum between the hips and the shoulders, thereby further improving the steering operability of the occupant.

In the present invention, the seat backrest supporting means may rotatably support the seat backrest in the yaw direction of the vehicle.

In this manner, it is possible to naturally move the shoulder blades of the occupant during the steering operation by rotatably supporting the seat backrest in the yaw direction of the vehicle. Accordingly, it is possible to ensure the smooth movement of the waist which uses the trunk muscle and moves the shoulder blades.

In the present invention, the rotation axis of the seat backrest using the seat backrest supporting means may pass near a chest of the occupant.

Since the shoulder blades are frequently moved mainly around a thoracic spine or the lumbar spine, if the rotation axis of the seat backrest passes near the chest of the occupant, the bending of the lumbar spine or the twisting of the lumbar spine is further facilitated. Accordingly, it is possible to further improve the steering operability of the occupant.

The vehicle seat apparatus according to the present invention is a vehicle seat apparatus having the seat unit and the seat backrest arranged on the rear side of the seat unit, and includes seat unit moving means for moving the inside of the seat unit in the vehicle turning direction relatively upward in the vertical direction of the vehicle seat apparatus with respect to the outside of the seat unit in the vehicle turning direction.

According to the vehicle seat apparatus of the present invention, it is possible to move the right side and the left side of the hips of the occupant relatively in the vertical direction of the vehicle seat apparatus by moving the seat unit using the seat unit moving means. This can induce the occupant to adopt the posture capable of performing the comfortable steering operation or the posture excellent in the posture retention during the turning. Therefore, it is possible to improve the posture retention of the occupant.

For example, when the occupant performs the steering operation to turn the vehicle, if the seat unit is moved by the seat unit moving means, the occupant can move the inside of the hips of the occupant in the vehicle turning direction relatively upward in the vertical direction of the vehicle seat apparatus with respect to the outside of the hips of the occupant in the vehicle turning direction. This motion is an optimum motion when viewed from the law of conservation of angular momentum between the hips and the shoulders, thereby improving the steering operability of the occupant. Moreover, since the occupant moves the hips by moving the seat unit using the seat unit moving means, the occupant can rotate the steering wheel by using not only the arm's muscle but also the trunk muscle which is bigger and has the physical endurance stronger than the arm's muscle. Accordingly, fatigue of the muscles of the arms, the shoulders and the neck caused by the steering operation is lessened, thereby enabling the comfortable steering operation.

In addition, even while the vehicle is turning, it is possible to allow the occupant to maintain the posture of the moved hips by using the seat unit moving means. Therefore, the occupant extends the trunk side muscle outside of the vehicle turning direction and contracts the trunk side muscle inside of the vehicle turning direction, thereby improving the lateral stiffness. Accordingly, even without depending on a large side support, the occupant can withstand the lateral force acting outward in the vehicle turning direction. Therefore, it is possible to obtain a lightweight and compact seat.

In addition, since during every steering operation the seat unit moving means moves the seat unit to move the hips of the occupant and the occupant performs the movement of the waist for bending the lumbar spine by using the trunk muscle, the occupant can perform the movement of the waist even during the driving of the vehicle. Since this suppresses the trunk muscle from being weakened, it is possible to suppress diseases such as backache due to the weakened trunk muscle. In addition, since blood circulation is promoted around the waist, it is possible to suppress the diseases such as weakened viscera function due to poor blood circulation around the waist. For these reasons, it is possible to achieve health promotion by driving the vehicle.

In the present invention, the seat unit moving means may move the side of the seat unit in the same direction as the turning direction of the vehicle relatively forward in the longitudinal direction of the vehicle seat apparatus with respect to the side of the seat unit in the direction opposite as the turning direction of the vehicle.

In this manner, it is possible to move the right side and the left side of the hips of the occupant relatively in the longitudinal direction of the vehicle seat apparatus by moving the seat unit using the seat unit moving means. This can induce the occupant to adopt the posture capable of performing the comfortable steering operation or the posture excellent in the posture retention during the turning. Therefore, it is possible to further improve the posture retention of the occupant.

For example, when the occupant performs the steering operation to turn the vehicle, if the seat unit is moved by the seat unit moving means, the occupant can move the inside of the hips of the occupant in the vehicle turning direction relatively forward in the longitudinal direction of the vehicle seat apparatus with respect to the outside of the hips of the occupant in the vehicle turning direction. This motion is an optimum motion when viewed from the law of conservation of angular momentum between the hips and the shoulders, thereby further improving the steering operability of the occupant.

In the present invention, the vehicle seat apparatus may further include seat backrest moving means for moving the inside of the seat backrest in the vehicle turning direction relatively downward in the vertical direction of the vehicle seat apparatus with respect to the outside of the seat backrest in the vehicle turning direction.

In this manner, it is possible to move the right side and the left side of the shoulder blades of the occupant relatively in the vertical direction of the vehicle seat apparatus by moving the seat unit using the seat unit moving means. This enables the occupant to move not only the hips but also the shoulder blades. Accordingly, this can induce the occupant to adopt the stable posture of the hips and the lumbar spine according to a travelling state of the vehicle or a steering state of the vehicle. Therefore, it is possible to further improve the steering operability of the occupant.

In the present invention, the seat backrest moving means may move the inside of the seat backrest in the vehicle turning direction relatively rearward in the longitudinal direction of the vehicle seat apparatus with respect to the outside of the seat backrest in the vehicle turning direction, and the vehicle seat apparatus may further include movement direction regulating means for moving the seat unit and the seat backrest in the opposite directions in the longitudinal direction of the vehicle seat apparatus.

In this manner, it is possible to move the right side and the left side of the shoulder blades of the occupant relatively in the longitudinal direction of the vehicle seat apparatus by moving the seat backrest using the seat backrest moving means. In addition, it is possible to allow the occupant to twist vertebrae by moving the shoulder blades of the occupant. On the other hand, since the seat unit and the seat backrest are moved in the opposite directions in the longitudinal direction of the vehicle seat apparatus, it is possible to allow the occupant to twist the vertebra so that the inside of the hips of the occupant in the vehicle turning direction is always located further forward than the outside of the hips of the occupant in the vehicle turning direction. This can induce the occupant to adopt the stable posture of the hips, the lumbar spine and the shoulder blades according to a travelling state of the vehicle or a steering state of the vehicle. Therefore, it is possible to further improve the steering operability of the occupant.

In the present invention, the vehicle seat apparatus may set a rotation axis of the seat unit so that a rear side is higher than a front side in the longitudinal direction of the vehicle seat apparatus.

Since the human lumbar spine is tilted rearward, if the rotation axis of the hips of the occupant using the seat unit moving means is set so that the rear side is higher than the front side in the longitudinal direction of the vehicle seat apparatus, the bending of the lumbar spine or the twisting of the lumbar spine is facilitated. Accordingly, it is possible to further improve the steering operability of the occupant.

In the present invention, the rotation axis of the seat unit may pass near the waist of the occupant.

Since the hips are frequently moved mainly around the lumbar spine, if the rotation axis of the hips passes near the waist of the occupant, the bending of the lumbar spine or the twisting of the lumbar spine is further facilitated. Accordingly, it is possible to further improve the steering operability of the occupant.

The vehicle seat apparatus according to the present invention includes the seat unit and the seat backrest arranged on the rear side of the seat unit, and includes distance changing means for changing a distance between the seat unit and the seat backrest on one side in the lateral direction of the vehicle seat apparatus.

According to the vehicle seat apparatus of the present invention, the distance changing means changes a distance between the seat unit and the seat backrest on one side in the lateral direction of the vehicle seat apparatus. Accordingly, it is possible to change a distance between the shoulder of the occupant and the hips of the occupant on one side in the lateral direction of the vehicle seat apparatus. This can allow the occupant to adopt the posture capable of performing the comfortable steering operation or the posture excellent in the posture retention during the turning. Therefore, it is possible to further improve the posture retention of the occupant.

For example, when performing the steering operation, the occupant can bend the lumbar spine in the lateral direction and can further shorten a distance between the shoulder and the hip inside of the vehicle turning direction than a distance between the shoulder and the hip outside of the vehicle turning direction. This motion is an optimum motion when viewed from the law of conservation of angular momentum between the hips and the shoulders, thereby improving the steering operability of the occupant. Moreover, since the distance between the shoulder of the occupant and the hips of the occupant is changed by using the distance changing means, the occupant can rotate the steering wheel by using not only the arm's muscle but also the trunk muscle which is bigger and has the physical endurance stronger than the arm's muscle. Accordingly, fatigue of the muscles of the arms, the shoulders and the neck caused by the steering operation is lessened, thereby enabling the comfortable steering operation.

In addition, even while the vehicle is turning, the occupant can maintain the posture where the distance between the shoulder of the occupant and the hip of the occupant is changed by using the distance changing means. Therefore, the occupant extends the trunk side muscle outside of the vehicle turning direction and contracts the trunk side muscle inside of the vehicle turning direction, thereby improving the lateral stiffness. Accordingly, even without depending on a large side support, the occupant can withstand the lateral force acting outward in the vehicle turning direction. Therefore, it is possible to obtain a lightweight and compact seat.

In addition, since during every steering operation, the distance changing means changes the distance between the shoulder of the occupant and the hip of the occupant, and the occupant performs the movement of the lumbar spine for bending the lumbar spine by using the trunk muscle, the occupant can perform the movement of the waist even during the driving of the vehicle. Since this suppresses the trunk muscle from being weakened, it is possible to suppress diseases such as backache due to the weakened trunk muscle. In addition, since blood circulation is promoted around the waist, it is possible to suppress the diseases such as weakened viscera function due to poor blood circulation around the waist. For these reasons, it is possible to achieve health promotion by driving the vehicle.

The vehicle seat apparatus according to the present invention includes the seat unit and the seat backrest arranged on the rear side of the seat unit, and includes seat unit rotating means for rotating the seat unit in a top view of the vehicle seat apparatus and seat backrest rotating means for rotating the seat backrest in the top view of the vehicle seat apparatus. The seat unit rotating means and the seat backrest rotating means rotate the seat unit and the seat backrest in the opposite directions in the top view.

According to the vehicle seat apparatus of the present invention, the seat unit rotating means and the seat backrest rotating means rotate the seat unit and the seat backrest in the opposite directions in the top view of the vehicle seat apparatus. Accordingly, it is possible to allow the occupant to twist the lumbar spine by rotating the hips of the occupant and the shoulder of the occupant in the opposite directions in the top view of the vehicle seat apparatus. This can allow the occupant to adopt the posture capable of performing the comfortable steering operation or the posture excellent in the posture retention during the turning. Therefore, it is possible to further improve the posture retention of the occupant.

For example, when performing the steering operation, the occupant can twist the lumbar spine and can rotate the shoulder of the occupant in the vehicle turning direction by rotating the hips of the occupant in the direction opposite to the vehicle turning direction. This motion is an optimum motion when viewed from the law of conservation of angular momentum between the hips and the shoulders, thereby improving the steering operability of the occupant. Moreover, since the seat unit rotating means and the seat backrest rotating means rotate the hip of the occupant and the shoulder of the occupant in the opposite directions, the occupant can rotate the steering wheel by using not only the arm's muscle but also the trunk muscle which is bigger and has the physical endurance stronger than the arm's muscle. Accordingly, fatigue of the muscles of the arms, the shoulders and the neck caused by the steering operation is lessened, thereby enabling the comfortable steering operation.

In addition, even while the vehicle is turning, the occupant can maintain the posture where the seat unit rotating means and the seat backrest rotating means rotate the hip of the occupant and the shoulder of the occupant in the opposite directions. Therefore, the occupant twists the trunk muscle, thereby improving the lateral stiffness. Accordingly, even without depending on a large side support, the occupant can withstand the lateral force acting outward in the vehicle turning direction. Therefore, it is possible to obtain a lightweight and compact seat.

In addition, since during every steering operation, the seat unit rotating means and the seat backrest rotating means rotate the hip of the occupant and the shoulder of the occupant in the opposite directions, and the occupant performs the movement of the waist for twisting the waist by using the trunk muscle, the occupant can perform the movement of the waist even during the driving of the vehicle. Since this suppresses the trunk muscle from being weakened, it is possible to suppress diseases such as backache due to the weakened trunk muscle. In addition, since blood circulation is promoted around the waist, it is possible to suppress the diseases such as weakened viscera function due to poor blood circulation around the waist. For these reasons, it is possible to achieve health promotion by driving the vehicle.

Advantageous Effects of Invention

According to the present invention, it is possible to facilitate posture maintaining of an occupant during turning.

BRIEF DESCRIPTION OF DRAWINGS

FIG. 1 is a view illustrating a trunk motion to be adopted by a driver when a vehicle is turning right.

FIG. 2 is a view illustrating a trunk motion to be adopted by a driver when a vehicle is turning left.

DESCRIPTION OF EMBODIMENTS

Figure 3:
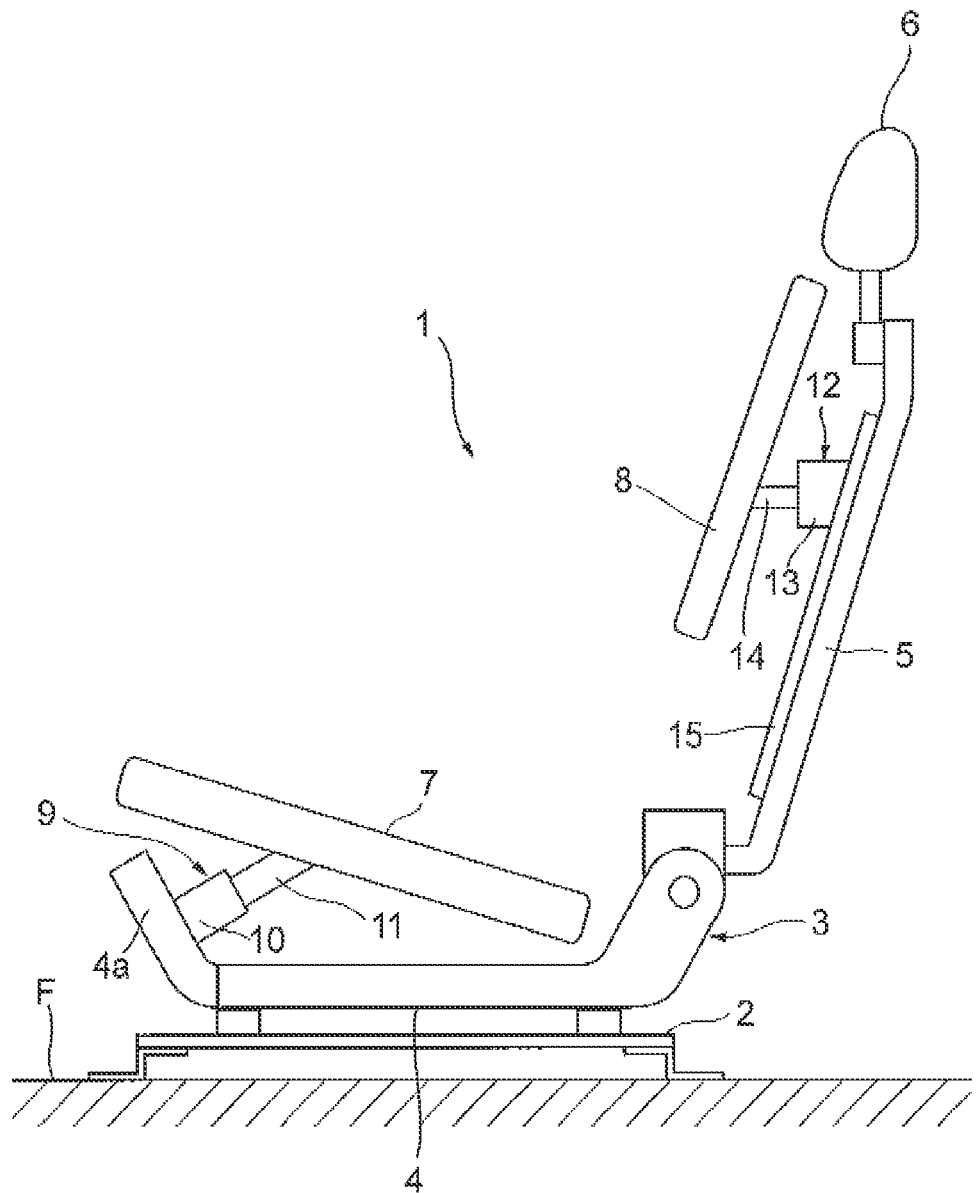
FIG. 3 is a schematic side view of a vehicle seat apparatus according to a first embodiment.

Hereinafter, referring to the drawings, an embodiment of a vehicle seat apparatus according to the present invention will be described. The same reference numerals are given to the same or equivalent elements in each drawing, and the repeated description will be omitted.

The vehicle seat apparatus according to the present embodiment is a driver's seat which is mounted on a vehicle and on which a driver of the vehicle sits. Therefore, a longitudinal direction, a vertical direction and a lateral direction of the vehicle seat apparatus according to the present embodiment is the same as the longitudinal direction, the vertical direction and the lateral direction of the vehicle, and the vertical, lateral and longitudinal directions described in the present embodiment represent the direction of the vehicle and the vehicle seat apparatus. In the present embodiment, the vehicle seat apparatus of the driver's seat will be described, but may be a vehicle seat apparatus for a front passenger seat other than the driver's seat.

First, referring to FIGS. 1 and 2, before describing the vehicle seat apparatus according to the present embodiment, an ideal motion when a driver performs a steering operation will be described. FIG. 1 is a view illustrating a trunk motion to be adopted by the driver when the vehicle is turning right. FIG. 1(a) illustrates a plan view of the driver and the FIG. 1(b) illustrates a rear view of the driver. FIG. 2 is a view illustrating the trunk motion to be adopted by the driver when the vehicle is turning left. FIG. 2(a) illustrates the plan view of the driver and the FIG. 1(b) illustrates the rear view of the driver.

The driver who tries to turn the vehicle performs a steering operation for rotating a steering wheel in a turning direction by using arms leading from shoulders. In the steering operation, the driver rotates the shoulders in a roll direction of the vehicle, moves the shoulder inside of the turning direction (side of the same direction as the turning direction) relatively downward in the vertical direction of the vehicle seat apparatus with respect to the shoulder outside of the turning direction (side of the opposite direction to the turning direction), rotates the shoulders in a yaw direction of a vehicle, and moves the shoulder inside of the turning direction relatively rearward in the longitudinal direction of the vehicle seat apparatus with respect to the shoulder outside of the turning direction. Then, the driver maintains the posture until the turning of the vehicle is completed. Here, the shoulder means a part of a body from a shoulder blade to the shoulder.

However, when viewed from the law of conservation of angular momentum between the hips and both shoulders, the driver who tries to turn the vehicle to the right adopts a posture illustrated in FIG. 1 and the driver who tries to turn the vehicle to the left adopts a posture illustrated in FIG. 2. Accordingly, the driver can perform the comfortable steering operation and maintain the posture.

The postures illustrated in FIGS. 1(a) and 2(a) are postures where a lumbar spine is bent and a distance between the hip and the shoulder inside of the vehicle turning direction becomes shorter than a distance between the hip and the shoulder outside of the vehicle turning direction. The posture is a posture where the hip and the shoulder are moved about the axis of the lumbar spine in a direction opposite to a roll direction of a vehicle, and is an optimum posture when viewed from the law of conservation of angular momentum between the hips and the shoulders in the roll direction. The law of conservation of angular momentum between the hips and the shoulders in the roll direction is expressed by the following formula (1) if a moment of inertia in the roll direction is set to $I_r$, and angular velocity is set to $\omega$.

$$I_r \omega = \text{constant} \quad (1)$$

The postures illustrated in FIGS. 1(b) and 2(b) are postures where the lumbar spine is twisted and the hips and the shoulders are rotated in the opposite directions. The posture is a posture where the hip and the shoulder are moved about the axis of the lumbar spine in a direction opposite to a yaw direction of a vehicle, and is an optimum posture when viewed from the law of conservation of angular momentum between the hips and the shoulders in the yaw direction. The law of conservation of angular momentum between the hips and the shoulders in the yaw direction is expressed by the following formula (2) if the moment of inertia in the yaw direction is set to $I_y$, and the angular velocity is set to $\omega$.

$$I_y \omega = \text{constant} \quad (2)$$

Thus, the vehicle seat apparatus according to the present embodiment enables the driver to adopt the postures illustrated in FIGS. 1 and 2, when turning the vehicle, by making the hips and the shoulder blades of a driver rotatable.

In the following, the vehicle seat apparatus according to the present embodiment will be described in detail.

First Embodiment

Figure 4:
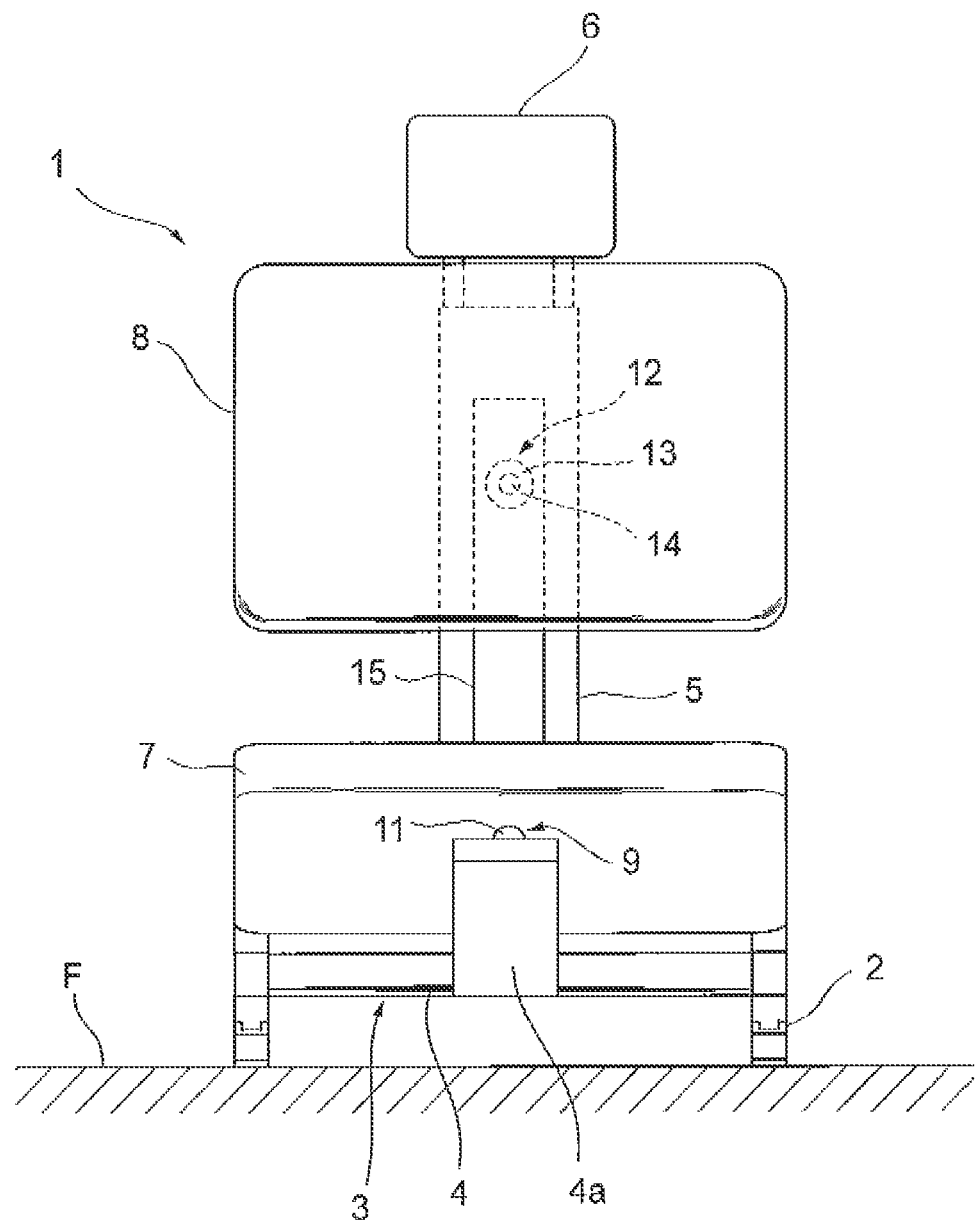
FIG. 4 is a schematic front view of a vehicle seat apparatus according to a first embodiment.
Figure 5:
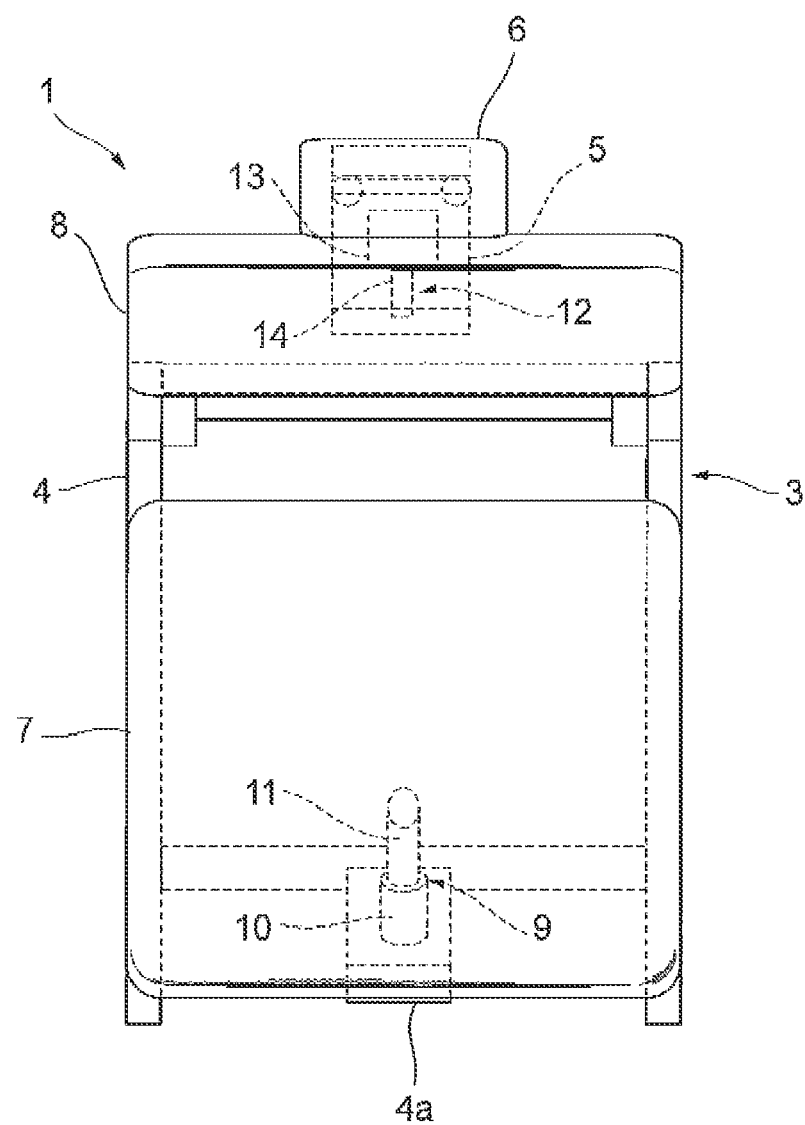
FIG. 5 is a schematic plan view of a vehicle seat apparatus according to a first embodiment.
Figure 6:
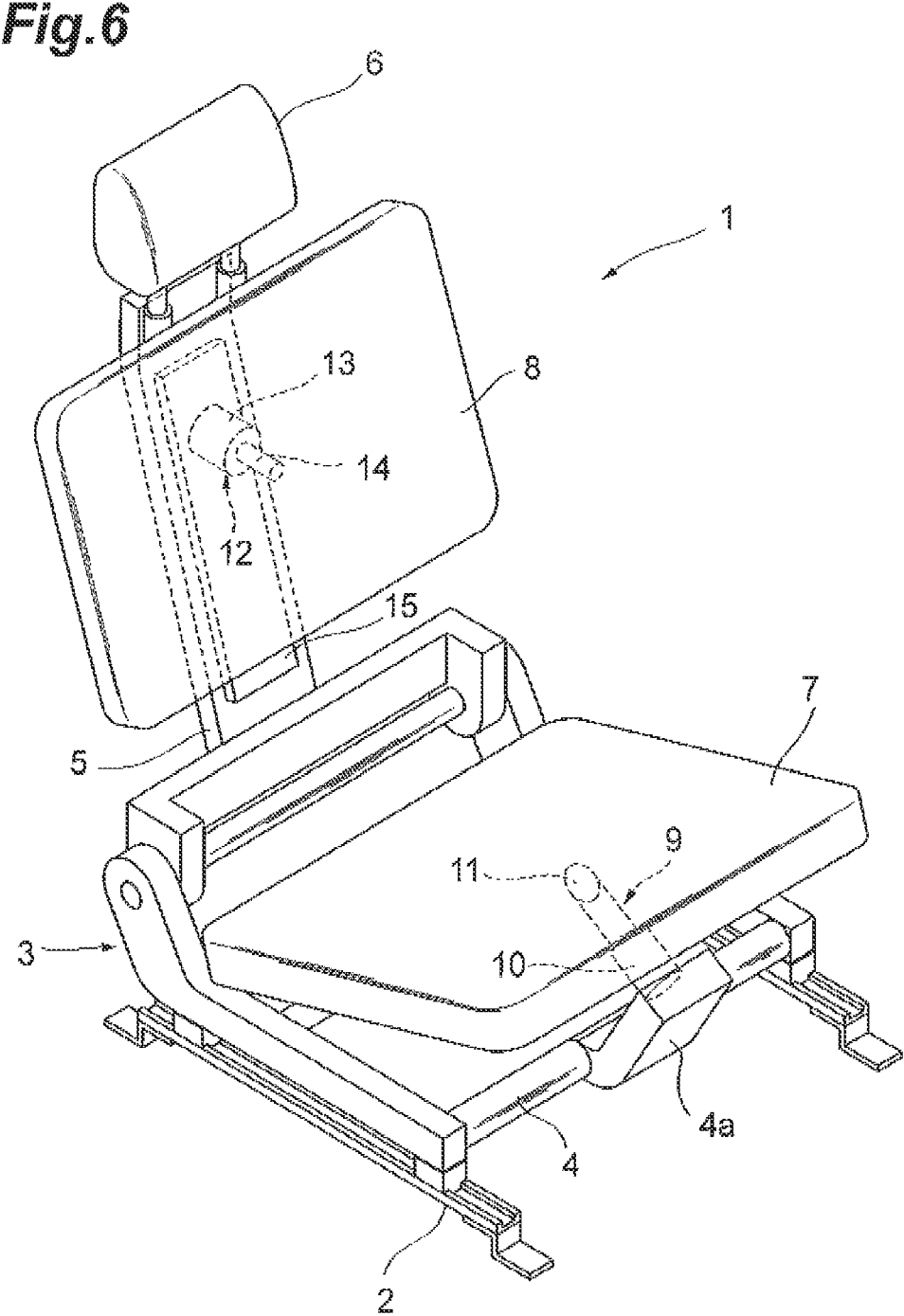
FIG. 6 is a schematic perspective view of a vehicle seat apparatus according to a first embodiment.

FIG. 3 is a schematic side view of the vehicle seat apparatus according to a first embodiment. FIG. 4 is a schematic front view of the vehicle seat apparatus according to the first embodiment. FIG. 5 is a schematic plan view of the vehicle seat apparatus according to the first embodiment. FIG. 6 is a schematic perspective view of the vehicle seat apparatus according to the first embodiment. In the drawing, in order to simplify a structure of the vehicle seat apparatus for easy understanding, members such as a cushioning material are omitted.

As illustrated in FIGS. 3 to 6, in a vehicle seat apparatus 1 according to the present embodiment, a seat frame 3 is attached to a rail 2 fixed to a floor F of a vehicle so as to be slidable in the longitudinal direction of the vehicle.

The seat frame 3 includes a first seat frame 4 attached to the rail 2 so as to be slidable and arranged substantially parallel to the floor F of the vehicle, and a second seat frame 5 erected from the first seat frame 4 and to which a headrest 6 is attached. The second seat frame 5 is attached to be capable of tilting with respect to the first seat frame 4 by using a reclining mechanism.

Then, a seat unit supporting mechanism 9 rotatably supporting a seat unit 7 is attached to the first seat frame 4, and a seat backrest supporting mechanism 12 rotatably supporting a seat backrest 8 is attached to the second seat frame 5.

Thighbones and hips of a driver are mainly placed on the seat unit 7. In the drawings, the seat unit 7 is illustrated in a flat plate, but a shape of the seat unit 7 is not particularly limited thereto. From an ergonomic point of view or from an industrial point of view, various designs may be applied thereto.

The seat backrest 8 is arranged on a rear side of the seat unit 7, and a driver's shoulder blades mainly lean on the seat backrest 8. In the drawings, the seat backrest 8 is illustrated in a flat plate, but a shape of the seat backrest 8 is not particularly limited thereto. From an ergonomic point of view or from an industrial point of view, various designs may be applied thereto.

Figure 7:
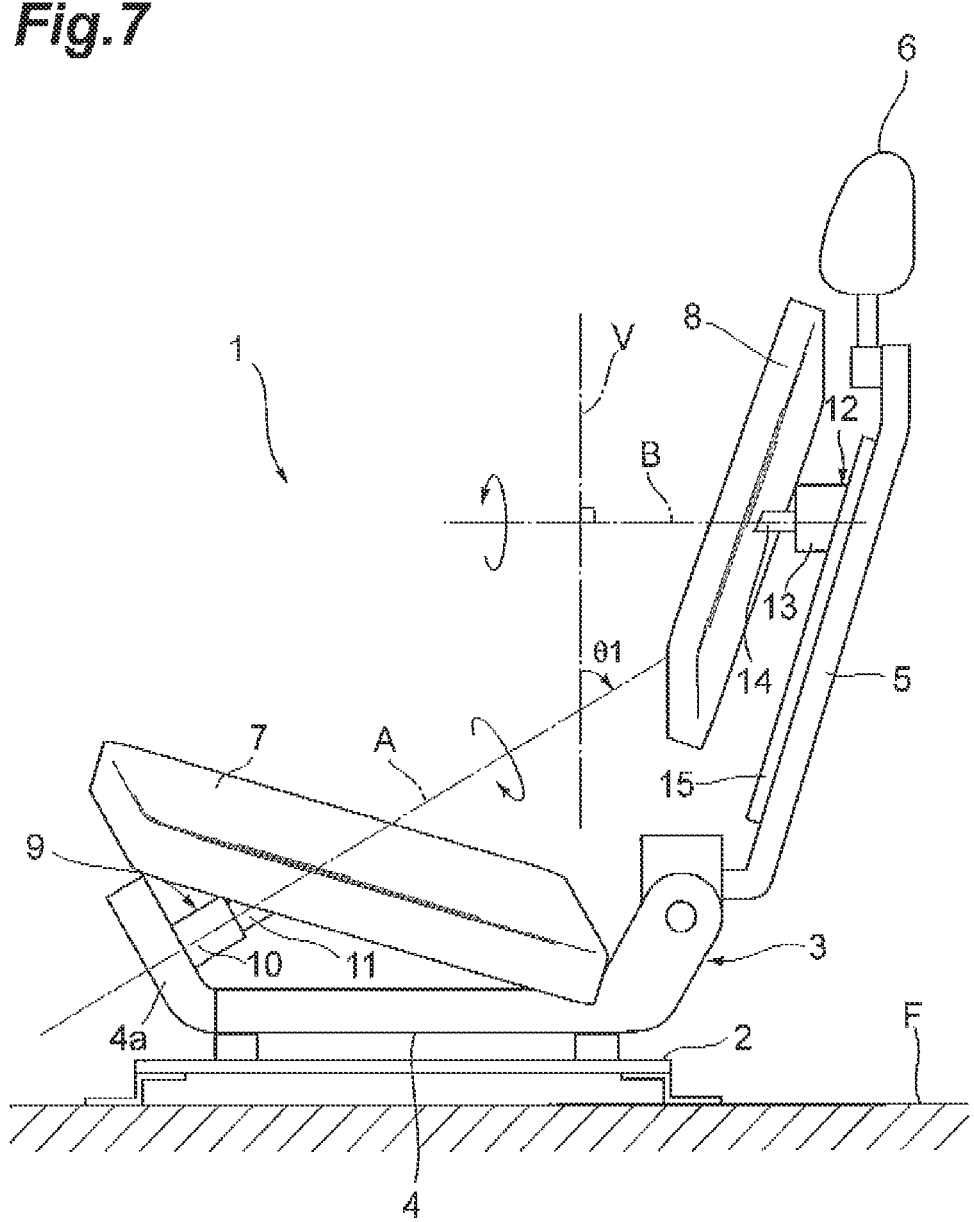
FIG. 7 is a schematic side view of a vehicle seat apparatus where a rotation axis of a seat unit supporting mechanism is rotated clockwise in a front view.
Figure 8:
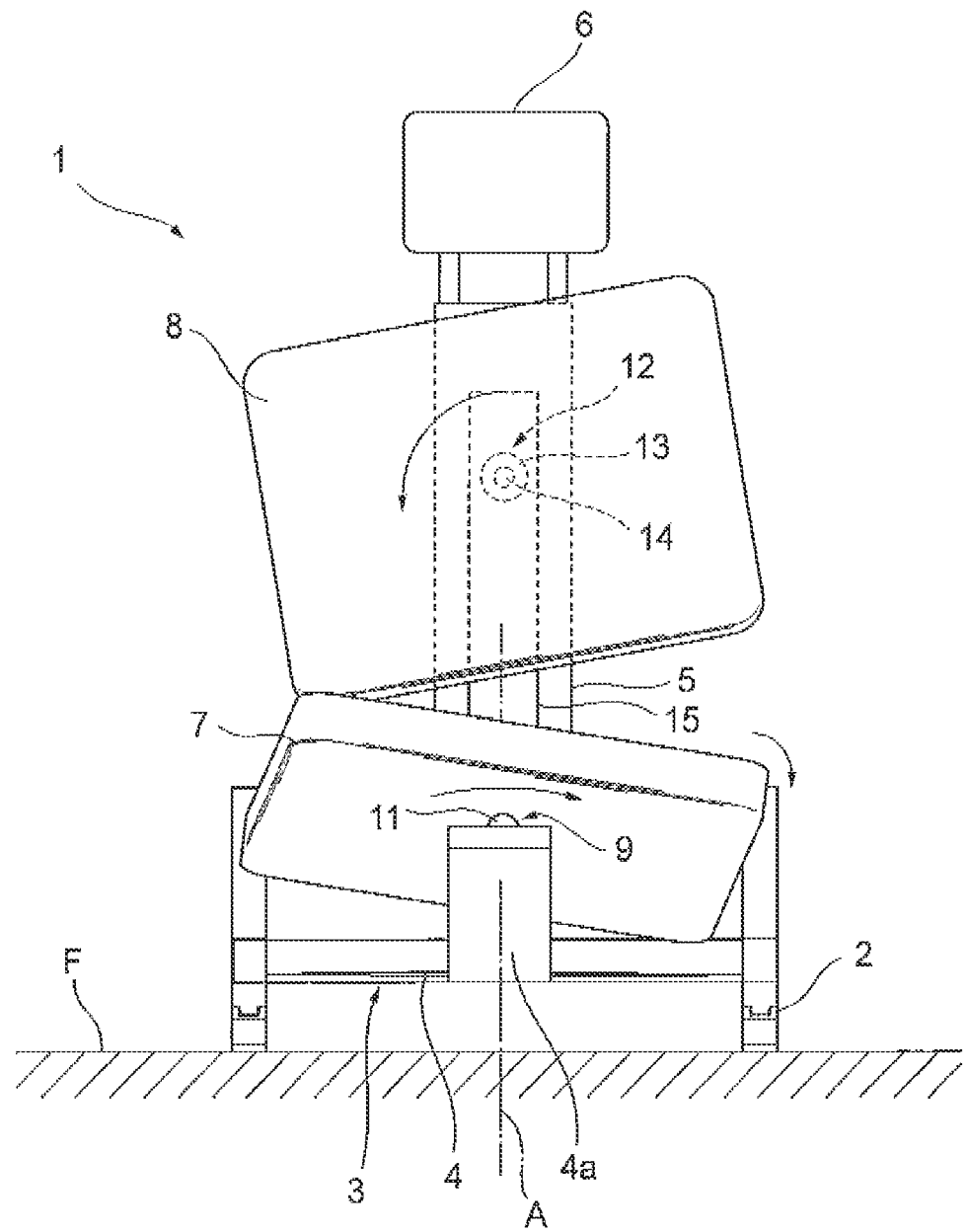
FIG. 8 is a schematic front view of a vehicle seat apparatus where a rotation axis of a seat unit supporting mechanism is rotated clockwise in a front view.
Figure 9:
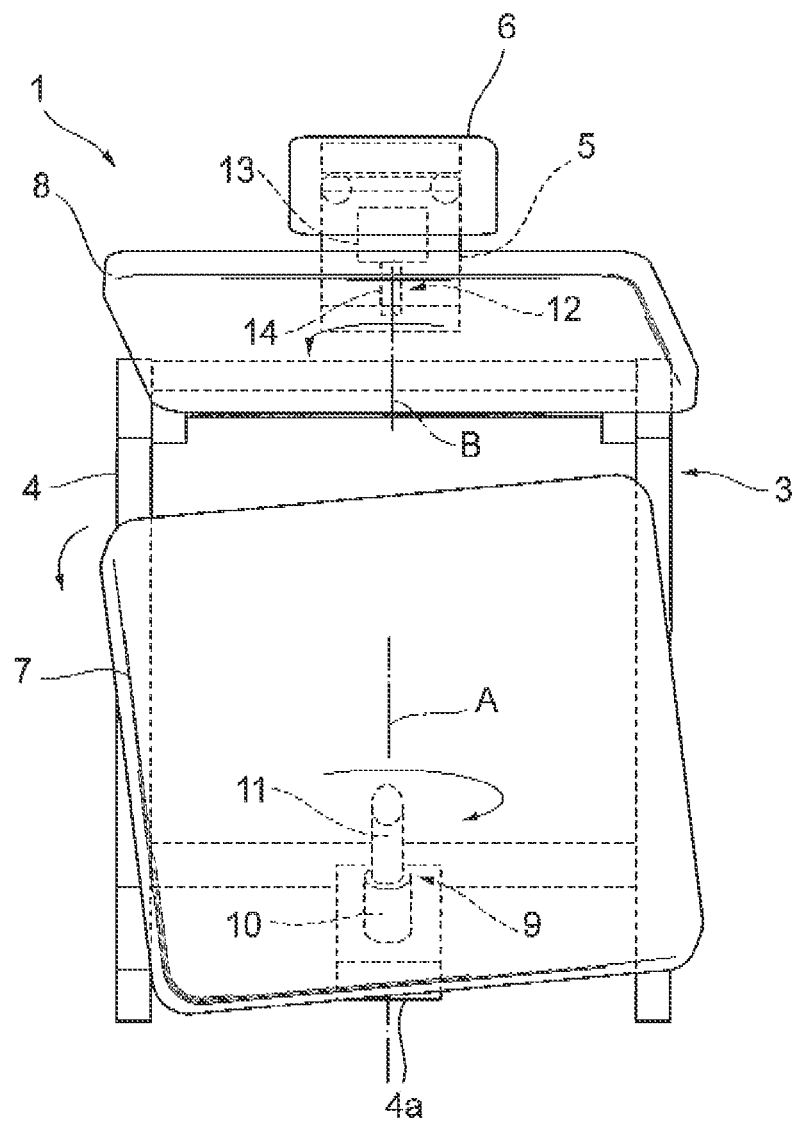
FIG. 9 is a schematic plan view of a vehicle seat apparatus where a rotation axis of a seat unit supporting mechanism is rotated clockwise in a front view.
Figure 10:
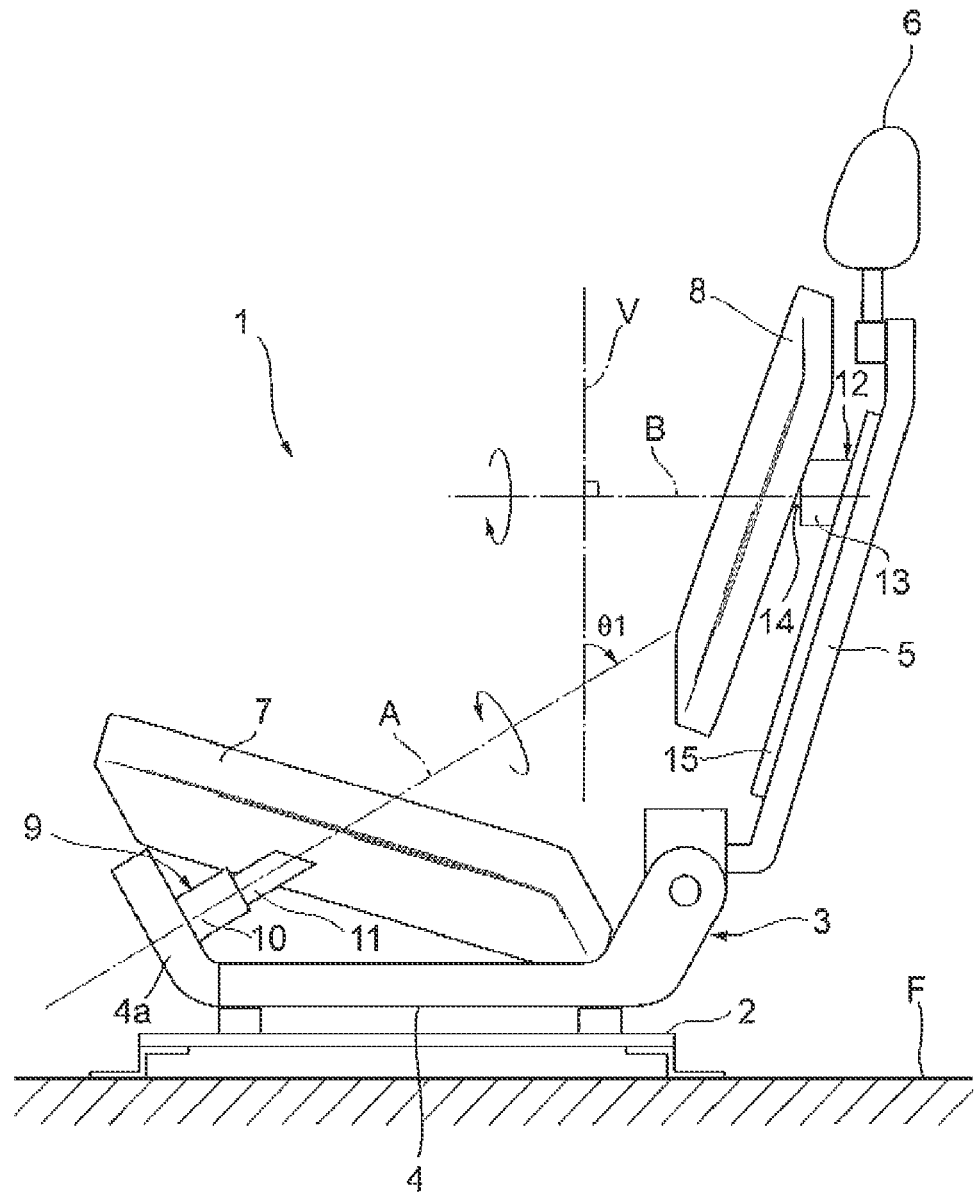
FIG. 10 is a schematic side view of a vehicle seat apparatus where a rotation axis of a seat unit supporting mechanism is rotated counterclockwise in a front view.
Figure 11:
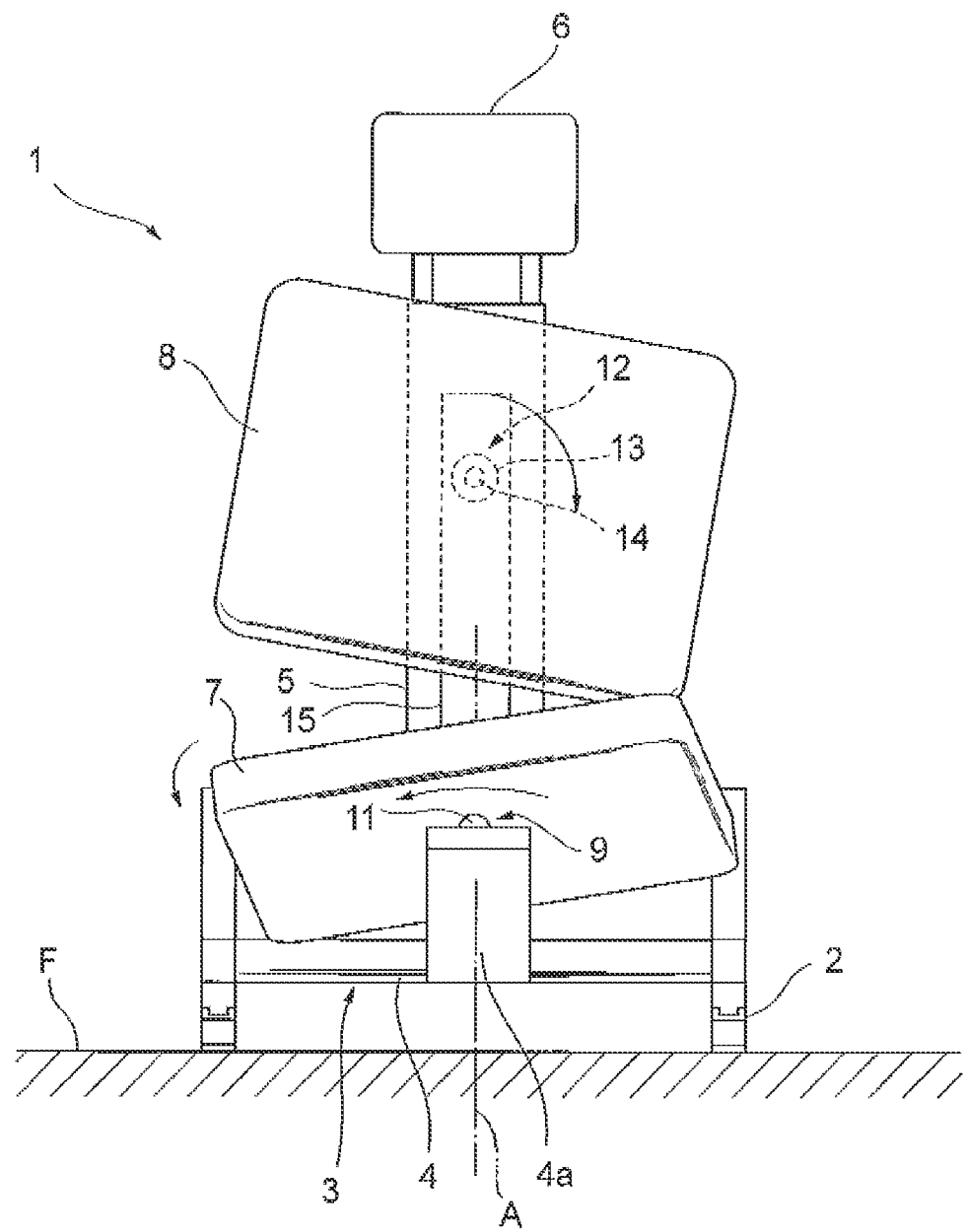
FIG. 11 is a schematic front view of a vehicle seat apparatus where a rotation axis of a seat unit supporting mechanism is rotated counterclockwise in a front view.
Figure 12:
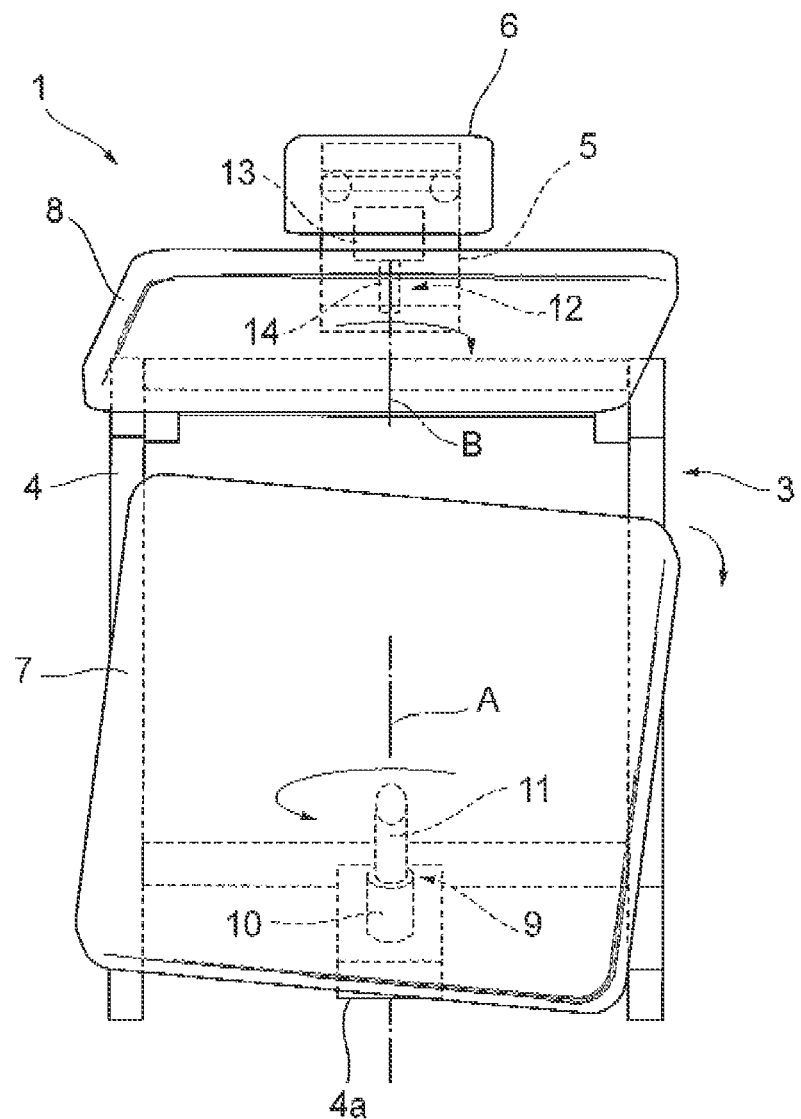
FIG. 12 is a schematic plan view of a vehicle seat apparatus where a rotation axis of a seat unit supporting mechanism is rotated counterclockwise in a front view.

FIG. 7 is a schematic side view of the vehicle seat apparatus where a rotation axis of the seat unit supporting mechanism is rotated clockwise in a front view. FIG. 8 is a schematic front view of the vehicle seat apparatus where the rotation axis of the seat unit supporting mechanism is rotated clockwise in a front view. FIG. 9 is a schematic plan view of the vehicle seat apparatus where the rotation axis of the seat unit supporting mechanism is rotated clockwise in a front view. FIG. 10 is a schematic side view of the vehicle seat apparatus where the rotation axis of the seat unit supporting mechanism is rotated counterclockwise in a front view. FIG. 11 is a schematic front view of the vehicle seat apparatus where the rotation axis of the seat unit supporting mechanism is rotated counterclockwise in a front view. FIG. 12 is a schematic plan view of the vehicle seat apparatus where the rotation axis of the seat unit supporting mechanism is rotated counterclockwise in a front view.

As illustrated in FIGS. 3 to 12, the seat unit supporting mechanism 9 is attached to a seat unit supporting mechanism attachment unit 4a extending forward and upward of the vehicle seat apparatus 1 from a tip of the first seat frame 4. In order to rotatably support the seat unit 7, the seat unit supporting mechanism 9 includes a thrust bearing 10 fixed to the first seat frame 4, and a thrust shaft 11 fixed to the seat unit 7 and rotatably connected to the thrust bearing 10. Therefore, a rotation axis A of the seat unit 7 using the seat unit supporting mechanism 9 is coincident with a rotation axis of the thrust shaft 11.

The rotation axis A is set so that a rear side is higher than a front side of the vehicle seat apparatus 1 in a longitudinal direction, and is set so as to pass near a waist of a driver sitting on the vehicle seat apparatus 1. Therefore, the seat unit 7 and the hips of the driver placed on the seat unit 7 can be rotated in a roll direction and a yaw direction of a vehicle around the rotation axis A. The term "waist" means a part of a body including a lumbar spine or a trunk muscle around the lumbar spine, and the term "near the waist" means the waist and a part around the waist.

For example, setting of the rotation axis A of the seat unit 7 can be performed by setting a tilt angle of the seat unit supporting mechanism attachment unit 4a to which the seat unit supporting mechanism 9 is attached. Then, if the seat unit supporting mechanism 9 is attached to a central portion of the seat unit supporting mechanism attachment unit 4a in a lateral direction, the rotation axis A can pass through vertebrae (lumbar spine) of a driver.

Then, as illustrated in FIGS. 7 to 9, if the thrust shaft 11 of the seat unit supporting mechanism 9 is rotated clockwise around the rotation axis A in a front view of the vehicle seat apparatus 1, the seat unit 7 is rotated around the rotation axis A in the roll direction and the yaw direction of the vehicle, and adopts the following postures.

That is, if the seat unit 7 is rotated around the rotation axis A in the roll direction of the vehicle, the seat unit 7 adopts a posture where a right side the seat unit 7 is moved relatively upward in a vertical direction of the vehicle seat apparatus 1 with respect to a left side of the seat 7. In this manner, a driver sitting on the seat unit 7 adopts a posture where the hips are rotated around the rotation axis A in the roll direction of the vehicle, and the right side of the hips is moved relatively upward in the vertical direction of the driver with respect to the left side of the hips. In the present embodiment, it is meant by "rotated clockwise in the roll direction" that the seat unit 7 and the hips are rotated around the rotation axis A in the roll direction of the vehicle in this manner. As illustrated in FIG. 8, the term "clockwise" means the rotation direction of the seat unit 7 in a front view of the vehicle seat apparatus 1.

In addition, if the seat unit 7 is rotated around the rotation axis A in the yaw direction of the vehicle, the seat unit 7 adopts a posture where the right side the seat unit 7 is moved relatively forward in the longitudinal direction of the vehicle seat apparatus 1 with respect to the left side of the seat 7. In this manner, the driver sitting on the seat unit 7 adopts a posture where the hips are rotated around the rotation axis A in the yaw direction of the vehicle, and the right side of the hips is moved relatively forward in the longitudinal direction of the driver with respect to the left side of the hips. In the present embodiment, it is meant by "rotated counterclockwise in the yaw direction" that the seat unit 7 and the hips are rotated around the rotation axis A in the yaw direction of the vehicle in this way. As illustrated in FIG. 9, the term "counterclockwise" means the rotation direction of the seat unit 7 in a plan view of the vehicle seat apparatus 1.

On the other hand, as illustrated in FIGS. 10 to 12, if the thrust shaft 11 of the seat unit supporting mechanism 9 is rotated counterclockwise around the rotation axis A in a front view of the vehicle seat apparatus 1, the seat unit 7 is rotated around the rotation axis A in the roll direction and the yaw direction of the vehicle, and adopts the following postures.

That is, if the seat unit 7 is rotated around the rotation axis A in the roll direction of the vehicle, the seat unit 7 adopts a posture where the left side of the seat unit 7 is moved relatively upward in the vertical direction of the vehicle seat apparatus 1 with respect to the right side of the seat unit 7. In this manner, the driver sitting on the seat unit 7 adopts a posture where the hips are rotated around the rotation axis A in the roll direction of the vehicle, and the left side of the hips is moved relatively upward in the vertical direction of the driver with respect to the right side of the hips. In the present embodiment, it is meant by "rotated counterclockwise in the roll direction" that the seat unit 7 and the hips are rotated around the rotation axis A in the roll direction of the vehicle in this way. As illustrated in FIG. 11, the term "counterclockwise" means the rotation direction of the seat unit 7 in a front view of the vehicle seat apparatus 1.

In addition, if the seat unit 7 is rotated around the rotation axis A in the yaw direction of the vehicle, the seat unit 7 adopts a posture where the left side the seat unit 7 is moved relatively forward in the longitudinal direction of the vehicle seat apparatus 1 with respect to the right side of the seat 7. In this manner, the driver sitting on the seat unit 7 adopts a posture where the hips are rotated around the rotation axis A in the yaw direction of the vehicle, and the left side of the hips is moved relatively forward in the longitudinal direction of the driver with respect to the right side of the hips. In the present embodiment, it is meant by "rotated clockwise in the yaw direction" that the seat unit 7 and the hips are rotated around the rotation axis A in the yaw direction of the vehicle in this way. As illustrated in FIG. 12, the term "clockwise" means the rotation direction of the seat unit 7 in a plan view of the vehicle seat apparatus 1.

Figure 13:
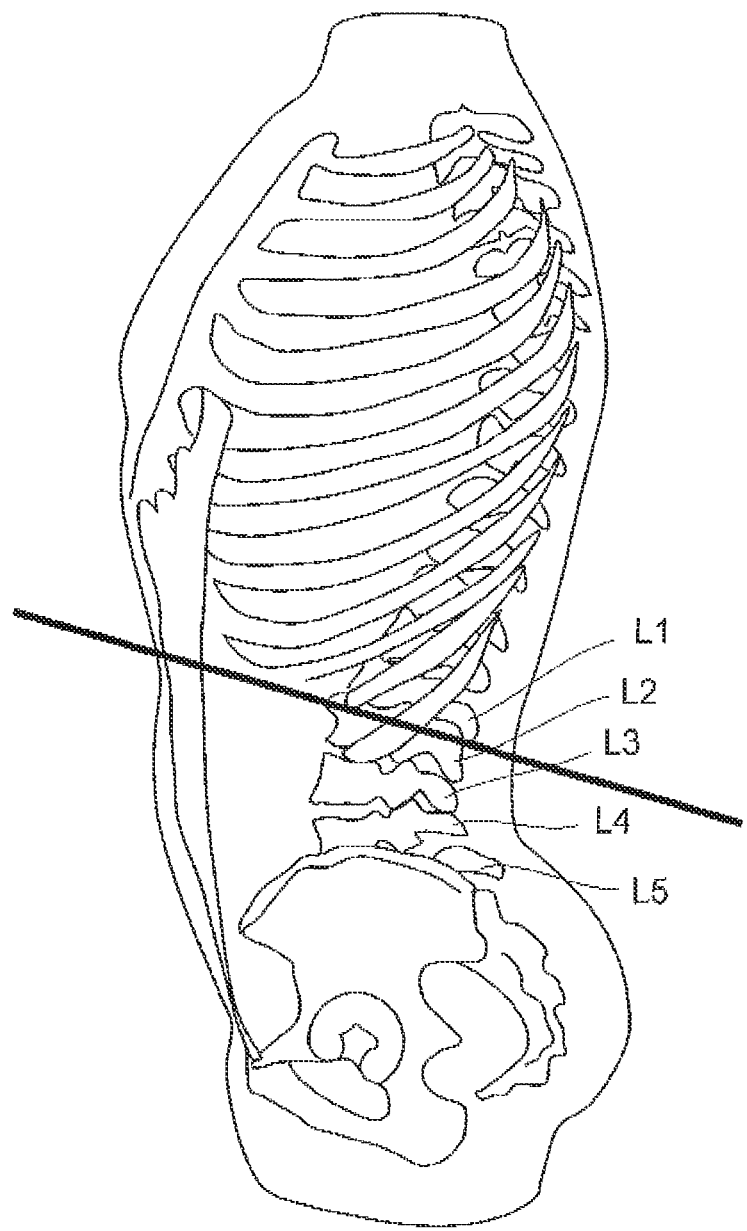
FIG. 13 is a side view illustrating a skeleton of a human upper body.

Here, referring to FIG. 13, a setting angle of the rotation axis A of the seat unit 7 will be described. FIG. 13 is a side view illustrating a skeleton of a human upper body. As illustrated in FIG. 13, a spine is configured to have a plurality of vertebrae connected via discs, and is curved in an S-shape in a side view. The lumbar spine configuring a portion of the spine is configured to have five vertebrae connected upward of a sacral bone of the hips (also referred to as a "sacral vertebra"), and extends upward while being inclined rearward from the sacral bone of the hips. The respective vertebrae configuring the lumbar spine are individually referred to as L1 to L5 from above. Then, the discs connecting the respective vertebrae configuring the lumbar spine enables the lumbar spine to be bent or twisted. Therefore, in a motion twisting the lumbar spine, if an axis passing through the discs and orthogonal to a surface of the discs is set to a rotation axis, the most comfortable motion is obtained.

In the posture where the driver sits on the vehicle seat apparatus 1, the axis orthogonal to the surface of the discs of the lumbar spine has a range where a tilting angle θ1 with respect to a vertical line V is approximately 45°. However, if the tilting angle of the rotation axis A with respect to the vertical line V is small, the driver's feet are far away from the rotation axis A. Accordingly, in some cases, the driver's feet (particularly, knees) are restless due to the rotation of the seat unit 7. Therefore, if the tilting angle of the rotation axis A with respect to the vertical line V is increased and a variation (rotation) of the seat unit 7 and the hips is increased in the roll direction rather than in the yaw direction, the steering operation is facilitated and the comfortable posture retention during the turning is obtained.

Thus, it is preferable to set the tilting angle θ1 with respect to the vertical line V of the rotation axis A to a range of 60°±15° with respect to the vertical line V. That is, it is possible to set the tilting angle θ1 to a range from 45° to 75°. In this case, the tilting angle θ1 may be set to a range from 50° to 70° or a range from 55° to 65°.

Further, from a viewpoint of comfortable twisting of the lumbar spine, for example, it is possible to set so that the rotation axis A passes through the vertebra L4 or L5 configuring the lumbar spine.

In addition, a seat unit regulating mechanism (not illustrated) which regulates a rotation angle range of the seat unit 7 using the seat unit supporting mechanism 9 is attached to the vehicle seat apparatus 1 so that the driver does not fall out from the seat unit 7 due to the rotation of the seat unit 7. For example, the seat unit regulating mechanism can be attached to various locations such as the seat unit supporting mechanism 9, the first seat frame 4 and the floor F. For example, the rotation angle regulating range of the seat unit 7 by using the seat unit regulating mechanism can be respectively set to 10° or less clockwise and counterclockwise. In this case, for example, the rotation angle regulating range of the seat unit 7 may be changed in stages such as 2.5°, 5° and 10° clockwise and counterclockwise respectively, or the rotation angle regulating range of the seat unit 7 may be linearly changed.

As illustrated in FIGS. 3 to 12, in order to rotatably support the seat backrest 8, the seat backrest supporting mechanism 12 includes the thrust bearing 13 fixed to the second seat frame 5, and the thrust shaft 14 fixed to the seat backrest 8 and rotatably connected to the thrust bearing 13. Therefore, a rotation axis B of the seat backrest 8 using the seat backrest supporting mechanism 12 is coincident with a rotation axis of the thrust shaft 14.

The rotation axis B of the seat backrest 8 is parallel (horizontal) to the longitudinal direction of the vehicle seat apparatus 1, and is set so as to pass near a chest of a driver sitting on the vehicle seat apparatus 1. Therefore, the seat backrest 8 and the driver's shoulder blades leaning on the seat backrest 8 can be rotated around the rotation axis B in the roll direction of the vehicle. The chest means a part of a body including a thoracic spine and muscles around the thoracic spine, and the term "near the chest" means the chest and a part around the chest.

A height of the rotation axis B of the seat backrest 8 can be adjusted by an attachment position of the seat backrest supporting mechanism 12 with respect to the second seat frame 5. In this case, as illustrated in the drawings, after a slide rail 15 extending in the vertical direction of the vehicle seat apparatus 1 is attached to the second seat frame 5, it is possible to attach the seat backrest supporting mechanism 12 to the second seat frame 5 via the slide rail 15 so as to be slidable in the vertical direction of the vehicle seat apparatus 1. In this manner, the shoulder blades can lean on the seat backrest 8 in response to a body size of a driver. Accordingly, it is possible to easily set the rotation axis B so as to pass near the chest of the driver sitting on the vehicle seat apparatus 1. Then, if the seat backrest supporting mechanism 12 is attached to a center portion of the second seat frame 5 in the lateral direction, the rotation axis B can pass through vertebrae (thoracic spine) of the driver.

Then, as illustrated in FIGS. 7 to 9, if the thrust shaft 14 of the seat backrest supporting mechanism 12 is rotated counterclockwise around the rotation axis B in a front view of the vehicle seat apparatus 1, the seat backrest 8 is rotated around the rotation axis B in the roll direction of the vehicle, and adopts the following postures.

That is, if the seat backrest 8 is rotated around the rotation axis B in the roll direction of the vehicle, the seat backrest 8 adopts a posture where the right side of the seat backrest 8 is moved relatively downward in the vertical direction of the vehicle seat apparatus 1 with respect to the left side of the seat backrest 8. In this manner, the driver leaning on the seat backrest 8 adopts a posture where the shoulder blades are rotated around the rotation axis B in the roll direction of the vehicle, and the right side of the shoulder blades is moved relatively downward in the vertical direction of the driver with respect to the left side of the shoulder blades. In the present embodiment, it is meant by "rotated counterclockwise in the roll direction" that the seat backrest 8 and the shoulder blades are rotated around the rotation axis B in the roll direction of the vehicle in this way. As illustrated in FIG. 8, the term "counterclockwise" means the rotation direction of the seat backrest 8 in a front view of the vehicle seat apparatus 1.

On the other hand, as illustrated in FIGS. 10 to 12, in a front view of the vehicle seat apparatus 1, if the thrust shaft 14 of the seat backrest supporting mechanism 12 is rotated clockwise around the rotation axis B, the seat backrest 8 is rotated around the rotation axis B in the roll direction of the vehicle, and adopts the following postures.

That is, if the seat backrest 8 is rotated around the rotation axis B in the roll direction of the vehicle, the seat backrest 8 adopts a posture where the left side of the seat backrest 8 is moved relatively downward in the vertical direction of the vehicle seat apparatus 1 with respect to the right side of the seat backrest 8. In this manner, the driver leaning on the seat backrest 8 adopts a posture where the shoulder blades are rotated around the rotation axis B in the roll direction of the vehicle, and the left side of the shoulder blades is moved relatively downward in the vertical direction of the driver with respect to the right side of the shoulder blades. In the present embodiment, it is meant by "rotated clockwise in the roll direction" that the seat backrest 8 and the shoulder blades are rotated around the rotation axis B in the roll direction of the vehicle in this way. As illustrated in FIG. 11, the term "clockwise" means the rotation direction of the seat backrest 8 in a front view of the vehicle seat apparatus 1.

In addition, it is preferable to provide a seat backrest regulating mechanism (not illustrated) which regulates the rotation angle range of the seat backrest 8 using the seat backrest supporting mechanism 12 in the vehicle seat apparatus 1. For example, the seat backrest regulating mechanism can be attached to various locations such as the seat backrest supporting mechanism 12, the second seat frame 5 and the floor F. For example, the rotation angle regulating range of the seat backrest 8 by using the seat backrest regulating mechanism can be respectively set to 10° or less clockwise and counterclockwise. In this case, for example, the rotation angle regulating range of the seat backrest 8 may be changed in stages such as 2.5°, 5° and 10° clockwise and counterclockwise respectively, or the rotation angle regulating range of the seat backrest 8 may be linearly changed.

Next, an operation of the vehicle seat apparatus 1 will be described.

As described above, in order to rotate the steering wheel, a driver who performs the steering operation moves the shoulder inside of the turning direction relatively downward in the vertical direction of the vehicle seat apparatus 1 with respect to the shoulder outside of the turning direction, and moves the shoulder inside of the turning direction relatively rearward in the longitudinal direction of the vehicle seat apparatus 1 with respect to the shoulder outside of the turning direction. At this time, when viewed from the law of conservation of angular momentum between the hips and the shoulders, if the lumbar spine is bent, a distance between the hip and the shoulder inside of the vehicle turning direction is more shortened than a distance between the hip and the shoulder outside of the vehicle turning direction, and the lumbar spine is twisted to rotate the hips and the shoulders in the opposite directions, it is possible to perform a comfortable steering operation. Since human movements are generated starting from the waist, this is a natural operation which has been empirically learned by humans.

Since the vehicle seat apparatus 1 according to the present embodiment rotatably supports the seat unit 7 and the seat backrest 8, a driver who performs the steering operation, consciously or unconsciously, adopts a natural and comfortable posture.

To be specific, the driver who tries to turn the vehicle to the right, consciously or unconsciously, tries to rotate the hips and the shoulders in the opposite directions. That is, the driver uses the trunk muscle to bend the lumbar spine, rotates the hips clockwise in the roll direction, and rotates the shoulders counterclockwise in the roll direction. In addition, the driver uses the trunk muscle to twist the waist, and rotates the hips counterclockwise in the yaw direction. Then, as illustrated in FIGS. 7 to 9, the seat unit 7 is rotated clockwise (refer to FIG. 8) in the roll direction and counterclockwise (refer to FIG. 9) in the yaw direction according to the motion of the hips, and the seat backrest 8 is rotated counterclockwise (refer to FIG. 8) in the roll direction according to the motion of the shoulder blades caused by the motion of the shoulders. In this manner, the driver's posture becomes the posture illustrated in FIG. 1. Thus, according to the law of conservation of angular momentum between the hips and the shoulders, the driver can perform the comfortable steering operation to turn the vehicle to the right. The driver who tries to turn the vehicle to the right may move the hips and the shoulders in the opposite directions immediately before performing the steering operation to rotate the steering wheel, simultaneously with the steering operation, or later after the steering operation.

Further, until completing the right turning of the vehicle, the driver can maintain the posture illustrated in FIG. 1.

On the other hand, the driver who tries to turn the vehicle to the left, consciously or unconsciously, tries to rotate the hips and the shoulders in the opposite directions. That is, the driver uses the trunk muscle to bend the lumbar spine, rotates the hips counterclockwise in the roll direction, and rotates the shoulders clockwise in the roll direction. In addition, the driver uses the trunk muscle to twist the waist, and rotates the hips clockwise in the yaw direction. Then, as illustrated in FIGS. 10 to 12, the seat unit 7 is rotated counterclockwise (refer to FIG. 11) in the roll direction and clockwise (refer to FIG. 12) in the yaw direction according to the motion of the hips, and the seat backrest 8 is rotated clockwise (refer to FIG. 11) in the roll direction according to the motion of the shoulder blades. In this manner, the driver's posture becomes the posture illustrated in FIG. 2. Thus, according to the law of conservation of angular momentum between the hips and the shoulders, the driver can perform the comfortable steering operation to turn the vehicle to the left. The driver who tries to turn the vehicle to the left may move the hips and the shoulders in the opposite directions immediately before performing the steering operation to rotate the steering wheel, simultaneously with the steering operation, or later after the steering operation.

Further, until completing the left turning of the vehicle, the driver can maintain the posture illustrated in FIG. 2.

Figure 14:
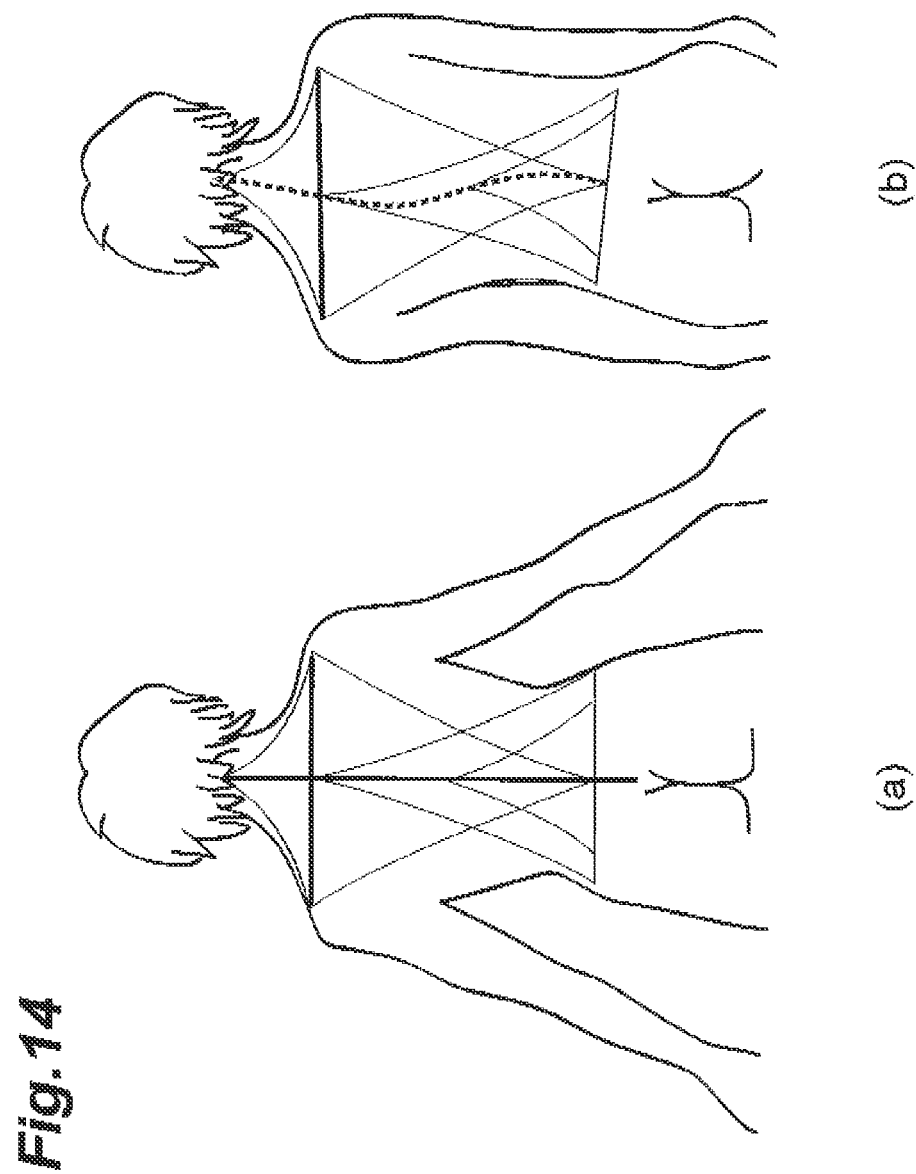
FIG. 14 is a rear view illustrating a human upper body.
Figure 15:
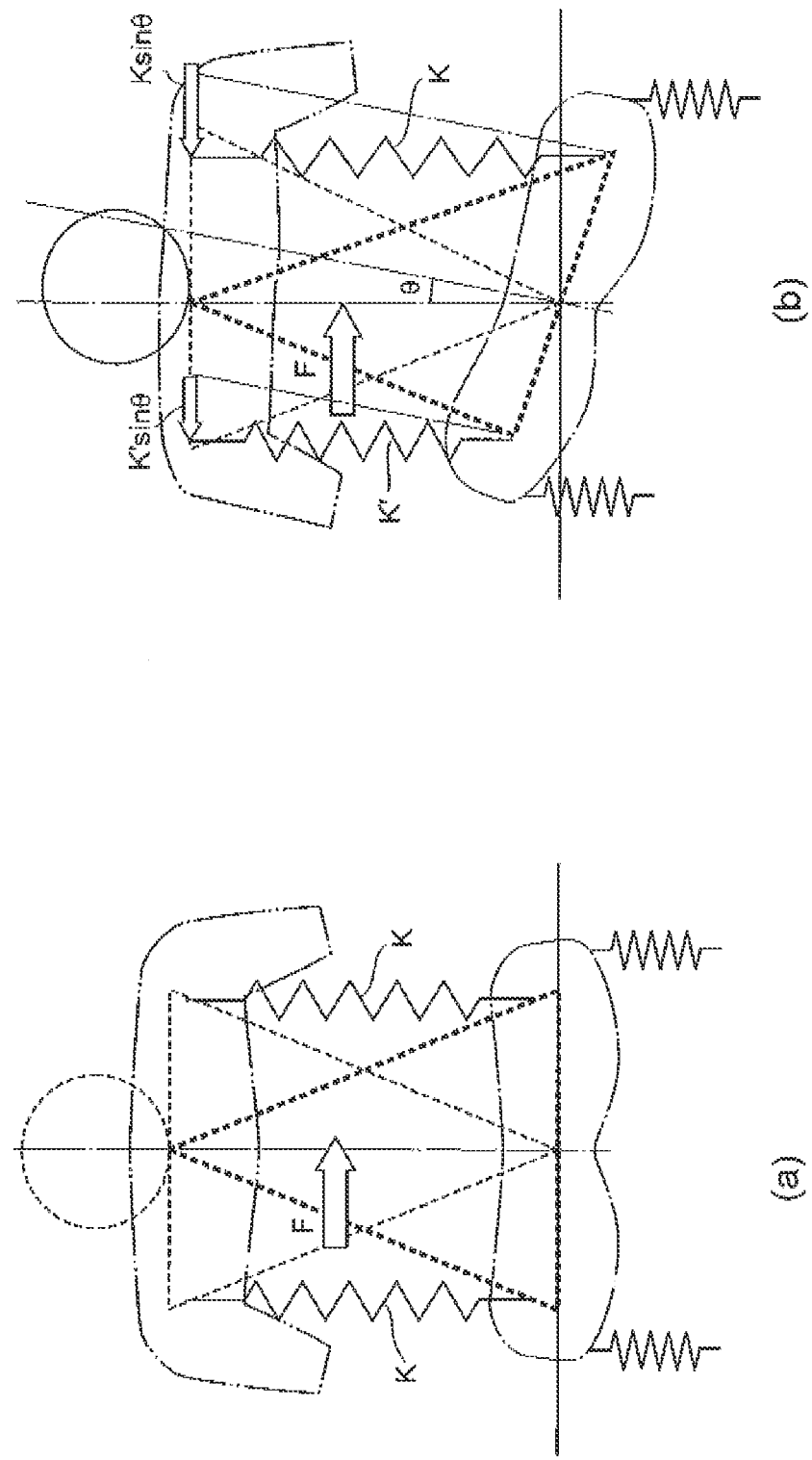
FIG. 15 is a view for explaining support reaction force in a lateral direction by using muscles.

Here, referring to FIGS. 14 and 15, dynamic considerations in a case where the driver has adopted postures illustrated in FIGS. 1 and 2 when turning the vehicle will be described. FIG. 14 is a rear view illustrating a skeleton of a human upper body. FIG. 15 is a view for explaining support reaction force in a lateral direction by using muscles. Then, FIGS. 14(*a*) and 15(*a*) illustrate a state of where the spine is extended straight, and the FIGS. 14(b) and 15(b) illustrate a state where the hips are rotated in the roll direction of the vehicle and the spine is curved in an S-shape.

The trunk muscles act as a support spring for supporting the body against external force. However, if the hips are fixed, as illustrated in FIG. 14(a), the hips and the shoulders are parallel to each other and the spine is extended straight. Accordingly, as illustrated in FIG. 15(a), the trunk muscles rarely function as the support spring against the lateral direction, and stiffness of the human body in the lateral direction is weakened. This is due to a nature of muscle strength working only in a contracting direction of the muscle. Therefore, if lateral force F is applied to the driver when turning the vehicle, the driver cannot withstand the lateral force F by using his or her own muscle strength. As a result, a large side support is required for supporting the driver receiving the lateral force F.

In contrast, if the hips are rotated, as illustrated in FIG. 14(b), the driver's spine is curved in the S-shape, a distance between one side hip and shoulder contracts and a distance between the other side hip and shoulder broadens. As illustrated in FIG. 15(b), if force of the support spring using one side trunk muscle is set to K', force of the support spring using the other side trunk muscle is set to K, and a rotation angle with respect to the vertical line of the lumbar spine is set to θ, as the support spring in the lateral direction by using the trunk muscle, force of (K'+K) sin θ is applied to the driver. In this manner, support reaction force against the lateral force F is significantly increased. Accordingly, since the strength of the human body in the lateral direction is strengthened, even without the large side support, the driver can withstand the lateral force F by using his or her own muscle strength.

Not only when the distance between the left and right shoulder blades and hips is changed, but also when the hips and the shoulder blades are rotated in the opposite directions in a top view, the trunk muscles are twisted to strengthen the stiffness of the driver in the lateral direction.

As described above, according to the vehicle seat apparatus 1 of the present embodiment, the seat unit supporting mechanism 9 rotatably supports the seat unit 7. Accordingly, the driver can bend the lumbar spine in the lateral direction and move the right side and the left side of the hips relatively in the vertical direction of the vehicle seat apparatus 1. This enables the driver to consciously or unconsciously adopt the posture capable of performing the comfortable steering operation or the posture excellent in the posture retention during the turning. Therefore, it is possible to improve the posture retention of the driver.

That is, when performing the steering operation, the driver can bend the lumbar spine in the lateral direction and move the hip inside of the vehicle turning direction relatively upward in the vertical direction of the vehicle seat apparatus 1 with respect to the hip outside of the vehicle turning direction. This motion is an optimum motion when viewed from the law of conservation of angular momentum between the hips and the shoulders, thereby improving the steering operability of the driver. Moreover, since the driver bends the lumbar spine in the lateral direction and moves the hips, the driver can rotate the steering wheel by using not only the arm's muscle but also the trunk muscle which is bigger and has the physical endurance stronger than the arm's muscle. Accordingly, fatigue of the muscles of the arms, the shoulders and the neck caused by the steering operation is lessened, thereby enabling the comfortable steering operation.

In addition, even while the vehicle is turning, the driver can maintain the posture where the driver bends the lumbar spine in the lateral direction and moves the hips. Therefore, the driver extends the trunk side muscle outside of the vehicle turning direction and contracts the trunk side muscle inside of the vehicle turning direction, thereby improving the lateral stiffness. Accordingly, even without depending on the large side support, the driver can withstand the lateral force acting outward in the vehicle turning direction. Therefore, it is possible to obtain the lightweight and compact seat.

In addition, since during every steering operation, the driver can perform the movement of the waist for moving the hips by using the trunk muscle, the driver can perform the movement of the waist even during the driving of the vehicle. Since this suppresses the trunk muscle from being weakened, it is possible to suppress diseases such as backache due to the weakened trunk muscle. In addition, since blood circulation is promoted around the waist, it is possible to suppress the diseases such as weakened viscera function due to poor blood circulation around the waist. For these reasons, it is possible to achieve health promotion by driving the vehicle.

Then, it is possible to naturally move the hips of the driver during the steering operation since the seat unit supporting mechanism 9 rotatably supports the seat unit 7 around the rotation axis A in the roll direction of the vehicle. Accordingly, it is possible to ensure a smooth movement of the waist which uses the trunk muscle and moves the hips.

In addition, since the seat unit supporting mechanism 9 rotatably maintains the seat unit 7, the driver can twist the vertebrae and move the right side and the left side of the hips relatively in the longitudinal direction of the vehicle seat apparatus 1. This enables the driver to consciously or unconsciously adopt the posture capable of performing the comfortable steering operation or the posture excellent in the posture retention during the turning. Therefore, it is possible to further improve the posture retention of the driver.

That is, when performing the steering operation, the driver can twist the lumbar spine and move the inside of the hips in the vehicle turning direction relatively forward in the longitudinal direction of the vehicle seat apparatus 1 with respect to the outside of the hips in the vehicle turning direction. This motion is an optimum motion when viewed from the law of conservation of angular momentum between the hips and the shoulders, thereby further improving the steering operability of the driver.

Then, it is possible to naturally move the hips of the driver during the steering operation since the seat unit supporting mechanism 9 rotatably supports the seat unit 7 around the rotation axis A in the yaw direction of the vehicle. Accordingly, it is possible to ensure a smooth movement of the waist which uses the trunk muscle and moves the hips.

In addition, the rotation axis A of the seat unit 7 is set so that the rear side is higher than the front side in the longitudinal direction of the vehicle seat apparatus 1, bending of the lumbar spine or twisting of the lumbar spine is facilitated. Accordingly, it is possible to further improve the steering operability of the driver.

In addition, it is possible to further facilitate the bending of the lumbar spine or the twisting of the lumbar spine by allowing the rotation axis A of the seat unit 7 to pass near the waist of the driver sitting on the vehicle seat apparatus 1. Accordingly, it is possible to further improve the steering operability of the driver.

In addition, since the seat backrest supporting mechanism 12 rotatably maintains the seat backrest 8, the driver can bend the lumbar spine in the lateral direction and move the right side and the left side of the shoulder blades relatively in the vertical direction of the vehicle seat apparatus 1. This enables the driver to consciously or unconsciously adopt the posture capable of performing the comfortable steering operation or the posture excellent in the posture retention during the turning. Therefore, it is possible to further improve the steering operability of the driver.

Then, since the seat backrest supporting mechanism 12 rotatably supports the seat backrest 8 around the rotation axis B in the roll direction of the vehicle, the shoulder blades of the driver can be naturally moved during the steering operation. Accordingly, it is possible to ensure a smooth movement of the waist which uses the trunk muscle and moves the shoulder blades.

In addition, it is possible to further facilitate the bending of the lumbar spine or the twisting of the lumbar spine by allowing the rotation axis B of the seat backrest 8 to pass near the chest of the driver sitting on the vehicle seat apparatus 1. Accordingly, it is possible to further improve the steering operability of the driver.

Second Embodiment

Next, a second embodiment will be described. A vehicle seat apparatus according to the second embodiment is basically the same as the vehicle seat apparatus according to the first embodiment, but a seat backrest supporting mechanism rotatably supporting a seat backrest is different from that of the vehicle seat apparatus according to the first embodiment. Therefore, in the following description, only the elements different from those of the vehicle seat apparatus according to the first embodiment will be described, and the description of the same elements as those of the vehicle seat apparatus according to the first embodiment will be omitted.

Figure 16:
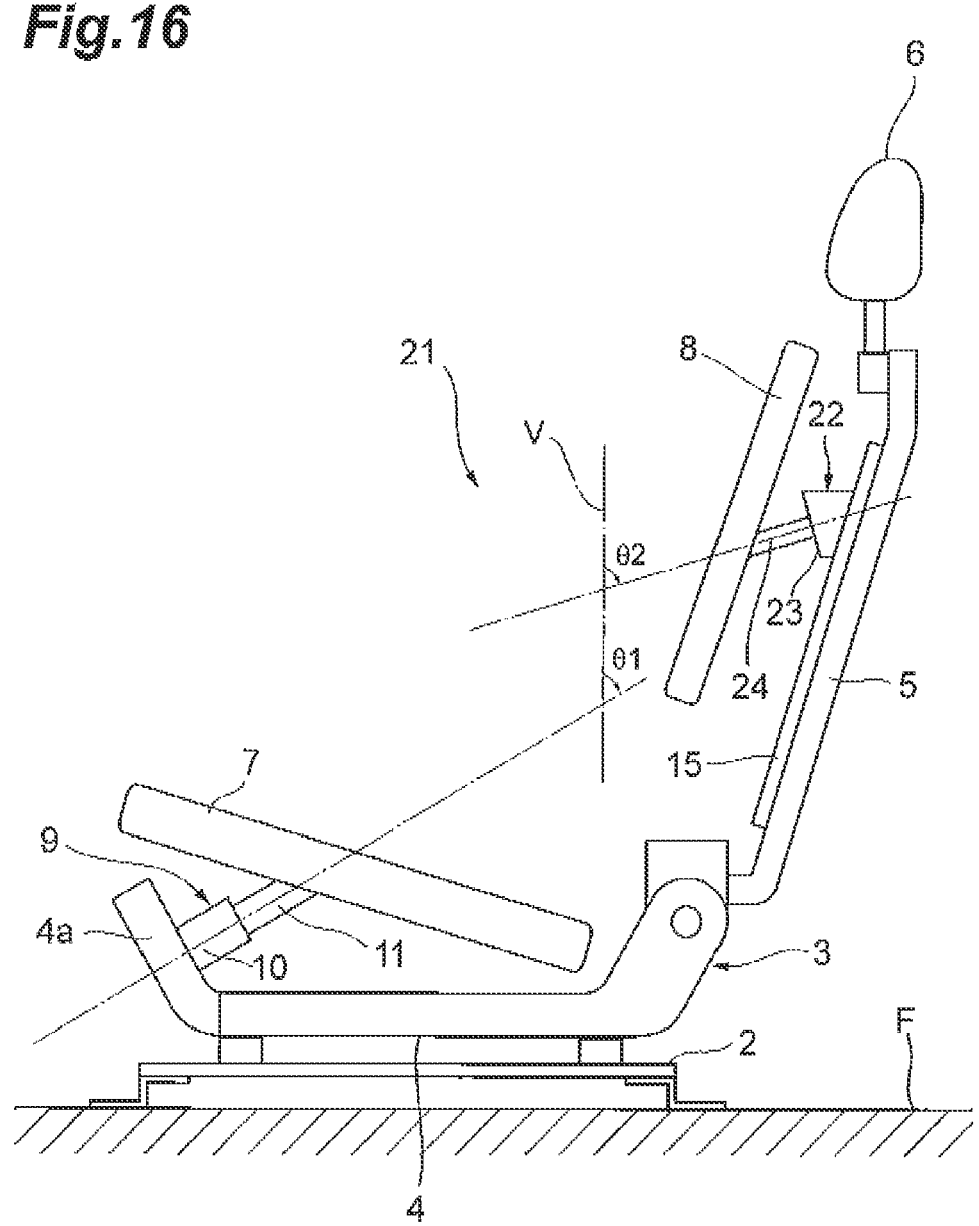
FIG. 16 is a schematic side view of a vehicle seat apparatus according to a second embodiment.

FIG. 16 is a schematic side view of a vehicle seat apparatus according to the second embodiment. As illustrated in FIG. 16, a vehicle seat apparatus 21 according to the second embodiment has a seat backrest supporting mechanism 22 rotatably supporting the seat backrest 8.

In order to rotatably support the seat backrest 8, the seat backrest supporting mechanism 22 includes a thrust bearing 23 fixed to the second seat frame 5, and a thrust shaft 24 fixed to the seat backrest 8 and rotatably connected to the thrust bearing 23. Therefore, a rotation axis C of the seat backrest 8 using the seat backrest supporting mechanism 22 is coincident with a rotation axis of the thrust shaft 24.

The rotation axis C of the seat backrest 8 is set so that a rear side is higher than a front side of the vehicle seat apparatus 21 in the longitudinal direction, and is set so as to pass near a chest of a driver sitting on the vehicle seat apparatus 21. Therefore, the seat backrest 8 and shoulder blades of the driver leaning on the seat backrest 8 can be rotated in the roll direction and the yaw direction of a vehicle around the rotation axis C.

Setting the rotation axis C of the seat backrest 8 can be adjusted by an attachment position of the seat backrest supporting mechanism 22 with respect to the second seat frame 5 and an attachment angle of the seat backrest supporting mechanism 22 with respect to the second seat frame 5. In this case, as illustrated in the drawings, after the slide rail 15 extending in the vertical direction of the vehicle seat apparatus 21 is attached to the second seat frame 5, it is possible to attach the seat backrest supporting mechanism 22 to the second seat frame 5 via the slide rail 15 so as to be slidable in the vertical direction of the vehicle seat apparatus 21. In this manner, the shoulder blades can lean on the seat backrest 8 in response to a body size of a driver. Accordingly, it is possible to easily set the rotation axis C so as to pass near the chest of the driver sitting on the vehicle seat apparatus 21. Then, if the seat backrest supporting mechanism 22 is attached to a center portion of the second seat frame 5 in the lateral direction, the rotation axis C can pass through the vertebra (thoracic spine) of the driver.

A tilting angle θ2 with respect to the vertical line V of the rotation axis C is not particularly limited. However, the rotation axis C may face a direction orthogonal to the discs of the thoracic spine or the lumbar spine of the driver sitting on the vehicle seat apparatus 21, or the rotation axis C may face a direction parallel to the rotation axis A.

Then, if the thrust shaft 24 of the seat backrest supporting mechanism 22 is rotated counterclockwise around the rotation axis C in a front view of the vehicle seat apparatus 21, the seat backrest 8 is rotated around the rotation axis C in the roll direction and the yaw direction of the vehicle, and adopts the following postures.

That is, if the seat backrest 8 is rotated around the rotation axis C in the roll direction of the vehicle, the seat backrest 8 adopts a posture where the right side of the seat backrest 8 is moved relatively downward in the vertical direction of the vehicle seat apparatus 21 with respect to the left side of the seat backrest 8. In this manner, the driver leaning on the seat backrest 8 adopts a posture where the shoulder blades are rotated around the rotation axis C in the roll direction of the vehicle, and the right side of the shoulder blades is moved relatively downward in the vertical direction of the driver with respect to the left side of the shoulder blades. In the present embodiment, it is meant by "rotated counterclockwise in the roll direction" that the seat backrest 8 and the shoulder blades are rotated around the rotation axis C in the roll direction of the vehicle in this way. The term "counterclockwise" means the rotation direction of the seat backrest 8 in a front view of the vehicle seat apparatus 21.

In addition, if the seat backrest 8 is rotated around the rotation axis C in the yaw direction of the vehicle, the seat backrest 8 adopts a posture where the right side of the seat backrest 8 is moved relatively rearward in the longitudinal direction of the vehicle seat apparatus 21 with respect to the left side of the seat backrest 8. In this manner, the driver leaning on the seat backrest 8 adopts a posture where the shoulder blades are rotated around the rotation axis C in the yaw direction of the vehicle, and the right side of the shoulder blades is moved relatively rearward in the longitudinal direction of the driver with respect to the left side of the shoulder blades. In the present embodiment, it is meant by "rotated clockwise in the yaw direction" that the seat backrest 8 and the shoulder blades are rotated around the rotation axis C in the yaw direction of the vehicle in this way. The term "clockwise" means the rotation direction of the seat backrest 8 in a plan view of the vehicle seat apparatus 21.

On the other hand, if the thrust shaft 24 of the seat backrest supporting mechanism 22 is rotated clockwise around the rotation axis C in a front view of the vehicle seat apparatus 21, the seat backrest 8 is rotated around the rotation axis C in the roll direction and the yaw direction, and adopts the following postures.

That is, if the seat backrest 8 is rotated around the rotation axis C in the roll direction of the vehicle, the seat backrest 8 adopts a posture where the left side of the seat backrest 8 is moved relatively downward in the vertical direction of the vehicle seat apparatus 21 with respect to the right side of the seat backrest 8. In this manner, the driver leaning on the seat backrest 8 adopts a posture where the shoulder blades are rotated around the rotation axis C in the roll direction of the vehicle, and the left side of the shoulder blades is moved relatively downward in the vertical direction of the driver with respect to the right side of the shoulder blades. In the present embodiment, it is meant by "rotated clockwise in the roll direction" that the seat backrest 8 and the shoulder blades are rotated around the rotation axis C in the roll direction of the vehicle in this way. The term "clockwise" means the rotation direction of the seat backrest 8 in a front view of the vehicle seat apparatus 21.

In addition, if the seat backrest 8 is rotated around the rotation axis C in the yaw direction of the vehicle, the seat backrest 8 adopts a posture where the left side of the seat backrest 8 is moved relatively forward in the longitudinal direction of the vehicle seat apparatus 21 with respect to the right side of the seat backrest 8. In this manner, the driver leaning on the seat backrest 8 adopts a posture where the shoulder blades are rotated around the rotation axis C in the yaw direction of the vehicle, and the left side of the shoulder blades is moved relatively forward in the longitudinal direction of the driver with respect to the right side of the shoulder blades. In the present embodiment, it is meant by "rotated counterclockwise in the yaw direction" that the seat backrest 8 and the shoulder blades are rotated around the rotation axis C in the yaw direction of the vehicle in this way. The term "counterclockwise" means the rotation direction of the seat backrest 8 in a plan view of the vehicle seat apparatus 21.

Then, in the vehicle seat apparatus 21, it is preferable to dispose a movement direction regulating mechanism (not illustrated) which regulates a motion of the seat unit supporting mechanism 9 and the seat backrest supporting mechanism 22 so that the seat unit 7 and the seat backrest 8 are rotated in opposite directions in a top view. If the seat unit 7 and the seat backrest 8 are rotated in the same direction in a top view, there is a possibility that a driver may not move the hips. Therefore, it is preferable to allow the hips and the shoulders of the driver to have an optimum motion when viewed from the law of conservation of angular momentum by disposing the movement direction regulating mechanism in the vehicle seat apparatus 21. Then, if the movement direction regulating mechanism is disposed in the vehicle seat apparatus 21, a rotation direction of the seat unit 7 and the hips of the driver around the rotation axis A in the yaw direction and a rotation direction of the seat backrest 8 and the shoulder blades of the driver around the rotation axis C in the yaw direction are directions opposite to each other. Therefore, the movement direction regulating mechanism functions as movement direction regulating means. For example, the movement direction regulating mechanism can be easily configured by using a gear or a wire.

As described above, according to the vehicle seat apparatus 21 of the present embodiment, the driver can bend the lumbar spine in the lateral direction and move the right side and the left side of the shoulder blades relatively in the longitudinal direction of the vehicle seat apparatus 21. This enables the driver to consciously or unconsciously adopt the posture capable of performing the comfortable steering operation or the posture excellent in the posture retention during the turning.

Moreover, since the seat unit 7 and the seat backrest 8 are rotated in the opposite directions in a top view, the driver can always rotate the hips and the shoulders in the opposite directions in the yaw direction. This posture allows the hips and the shoulders of the driver to have an optimum motion when viewed from the law of conservation of angular momentum, thereby further improving the steering operability of the driver.

Then, since the seat backrest supporting mechanism 22 rotatably supports the seat backrest 8 around the rotation axis C in the yaw direction of the vehicle, the shoulder blades of the driver can be naturally moved during the steering operation. Accordingly, it is possible to ensure a smooth movement of the waist which uses the trunk muscle and moves the shoulder blades.

Third Embodiment

Next, a third embodiment will be described. A vehicle seat apparatus according to the third embodiment is basically the same as the vehicle seat apparatus according to the first embodiment, but is different from the vehicle seat apparatus according to the first embodiment in that a drive device rotating a seat unit and a seat backrest is disposed. Therefore, in the following description, only the elements different from the vehicle seat apparatus according to the first embodiment will be described and the description of the same elements as those of the vehicle seat apparatus according to the first embodiment will be omitted.

Figure 17:
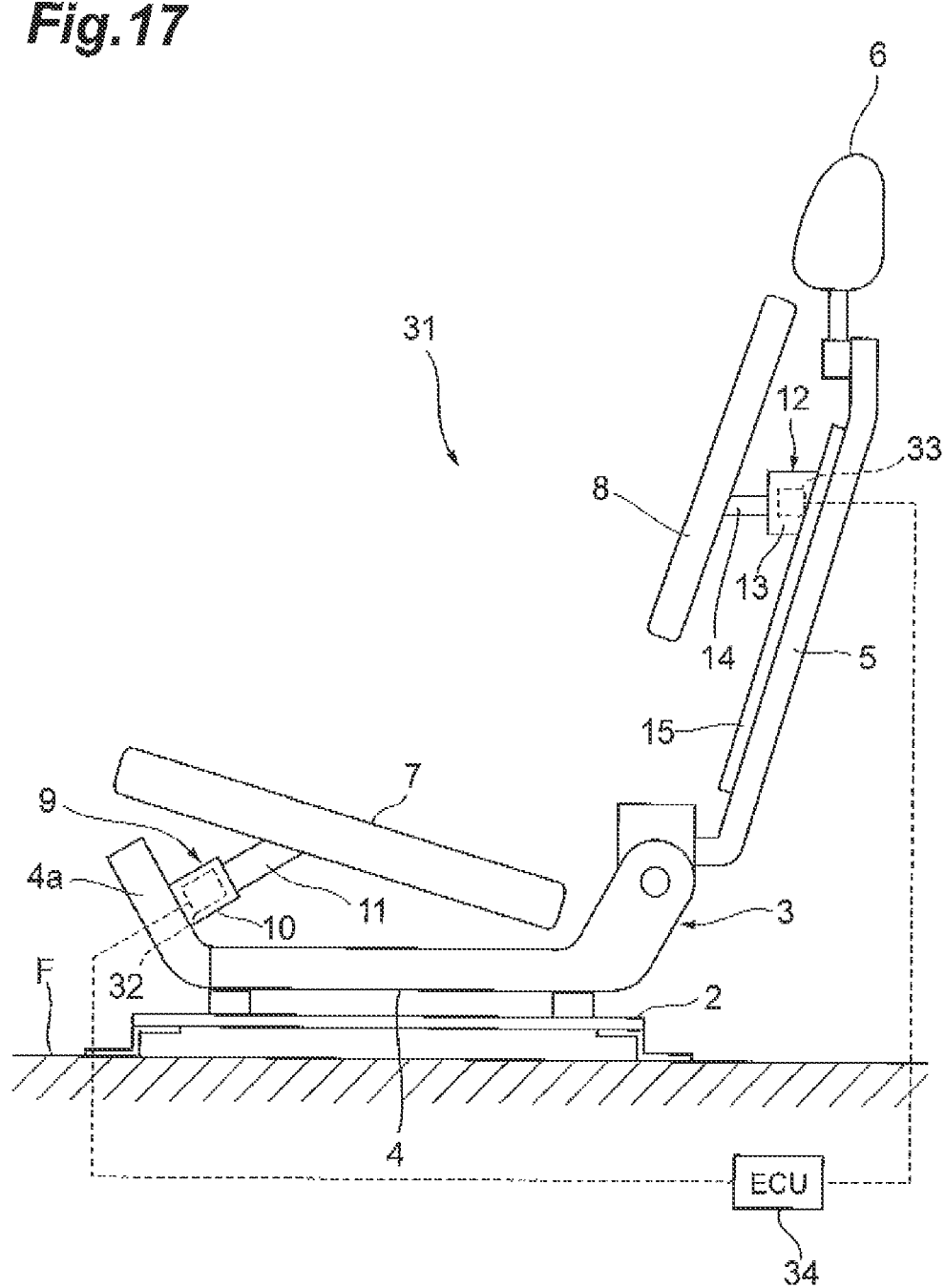
FIG. 17 is a schematic side view of a vehicle seat apparatus according to a third embodiment.

FIG. 17 is a schematic side view of a vehicle seat apparatus according to the third embodiment. As illustrated in FIG. 17, a vehicle seat apparatus 31 according to the third embodiment has a seat unit rotation drive device 32 rotatably driving the seat unit 7 rotatably supported by the seat unit supporting mechanism 9, and a seat backrest rotation drive device 33 rotatably driving the seat backrest 8 rotatably supported by the seat backrest supporting mechanism 12.

For example, the seat unit rotation drive device 32 can be configured to have a stepping motor which is incorporated in the thrust bearing 10 of the seat unit supporting mechanism 9. As described above, since the seat unit 7 is rotated around the rotation axis A, if the seat unit rotation drive device 32 rotatably drives the seat unit 7, the hips of a driver sitting on the vehicle seat apparatus 31 are rotated around the rotation axis A. Therefore, the rotation axis of the hips rotated by the seat unit rotation drive device 32 is set so that similarly to the seat unit 7, a rear side is higher than a front side in the longitudinal direction of the vehicle seat apparatus 31, and is set so as to pass near the waist of the driver sitting on the vehicle seat apparatus 31.

For example, the seat backrest rotation drive device 33 can be configured to have a stepping motor which is incorporated in the thrust bearing 13 of the seat backrest supporting mechanism 12. As described above, since the seat backrest 8 is rotated around the rotation axis B, if the seat backrest rotation drive device 33 rotatably drives the seat backrest 8, the shoulder blades of a driver sitting on the vehicle seat apparatus 31 are rotated around the rotation axis B. Therefore, the rotation axis of the shoulder blades rotated by the seat backrest rotation drive device 33 is set so as to pass near the chest of the driver sitting on the vehicle seat apparatus 31, similarly to the seat backrest 8.

An Electronic Control Unit (ECU) 34 is a computer performing an electronic control and configured to include a Central Processing Unit (CPU), a memory such as, a Read Only Memory (ROM) and a Random Access Memory (RAM), and input and output interfaces.

The ECU 34 is provided with a function for detecting turning of a vehicle. For example, the detection of the turning of the vehicle can be performed by obtaining road information ahead in a travelling direction from electronic map information or by detecting a steering angle of a steering wheel.

In addition, the ECU 34 is provided with a function for performing rotation drive control of the seat unit rotation drive device 32 and the seat backrest rotation drive device 33 during the turning of the vehicle. Here, for example, the term "during the turning of the vehicle" includes "immediately before the vehicle is turned (immediately before a driver rotates a steering wheel), when the vehicle starts to turn (when the driver starts to rotate the steering wheel) and while the vehicle is turning (while the driver is maintaining the rotated steering wheel)". Then, in at least one timing of the above-described timing, the ECU 34 performs the rotation drive control of the seat unit rotation drive device 32 and the seat backrest rotation drive device 33.

Next, the rotation drive control of the seat unit rotation drive device 32 and the seat backrest rotation drive device 33 which is performed by the ECU 34 will be described.

The ECU 34, when detecting right turning of a vehicle, performs rotation drive control of the seat unit rotation drive device 32 and the seat backrest rotation drive device 33, rotates the thrust shaft 11 of the seat unit supporting mechanism 9 clockwise around the rotation axis A in a front view of the vehicle seat apparatus 31, and rotates the thrust axis 14 of the seat backrest supporting mechanism 12 counterclockwise around the rotation axis B. Then, the seat unit 7 is rotated clockwise (refer to FIG. 8) in the roll direction and is rotated counterclockwise (refer to FIG. 9) in the yaw direction. In addition, the seat backrest 8 is rotated counterclockwise (refer to FIG. 8) in the roll direction. This induces the driver to adopt the posture illustrated in FIG. 1. That is, the right side of the hips is moved relatively upward in the vertical direction of the vehicle seat apparatus 31 with respect to the left side of the hips. In addition, the right side of the hips is moved relatively forward in the longitudinal direction of the vehicle seat apparatus 31 with respect to the left side of the hips. In addition, the right side of the shoulder blades is moved relatively downward in the vertical direction of the vehicle seat apparatus 31 with respect to the left side of the shoulder blades.

On the other hand, the ECU 34, when detecting left turning of the vehicle, performs the rotation drive control of the seat unit rotation drive device 32 and the seat backrest rotation drive device 33, rotates the thrust shaft 11 of the seat unit supporting mechanism 9 counterclockwise around the rotation axis A in a front view of the vehicle seat apparatus 1, and rotates the thrust axis 14 of the seat backrest supporting mechanism 12 clockwise around the rotation axis B. Then, the seat unit 7 is rotated counterclockwise (refer to FIG. 11) in the roll direction and is rotated clockwise (refer to FIG. 12) in the yaw direction. In addition, the seat backrest 8 is rotated clockwise (refer to FIG. 11) in the roll direction. This induces the driver to adopt the posture illustrated in FIG. 2. That is, the left side of the hips is moved relatively upward in the vertical direction of the vehicle seat apparatus 31 with respect to the right side of the hips. In addition, the left side of the hips is moved relatively forward in the longitudinal direction of the vehicle seat apparatus 31 with respect to the right side of the hips. In addition, the left side of the shoulder blades is moved relatively downward in the vertical direction of the vehicle seat apparatus 31 with respect to the right side of the shoulder blades.

The ECU 34 may maintain the rotation drive control of the seat unit rotation drive device 32 and the seat backrest rotation drive device 33 until completion of the turning of the vehicle, or may cancel the rotation drive control immediately or a predetermined period of time later after performing the rotation drive control of the seat unit rotation drive device 32 and the seat backrest rotation drive device 33.

As described above, according to the vehicle seat apparatus 31 of the present embodiment, it is possible to move the right side and the left side of the hips of the driver relatively in the vertical direction of the vehicle seat apparatus 31 by moving the seat unit 7 using the seat unit rotation drive device 32. This can induce the driver to adopt the posture capable of performing the comfortable steering operation or the posture excellent in the posture retention during the turning. Therefore, it is possible to improve the posture retention of the driver.

That is, when the driver performs the steering operation in order to turn the vehicle, it is possible to move the hip inside of the vehicle turning direction relatively upward in the vertical direction of the vehicle seat apparatus 31 with respect to the hip outside of the vehicle turning direction by moving the seat unit 7 using the seat unit rotation drive device 32. This motion allows the hips and the shoulders of the driver to have an optimum motion when viewed from the law of conservation of angular momentum, thereby improving the steering operability of the driver. Moreover, since the driver moves the hips by using the seat unit rotation drive device 32, the driver can rotate the steering wheel by using not only the arm's muscle but also the trunk muscle which is bigger and has the physical endurance stronger than the arm's muscle. Accordingly, fatigue of the muscles of the arms, the shoulders and the neck caused by the steering operation is lessened, thereby enabling the comfortable steering operation.

In addition, even while the vehicle is turning, the driver can maintain the posture where the driver moves the hips by using the seat unit rotation drive device 32. Therefore, the driver extends the trunk side muscle outside of the vehicle turning direction and contracts the trunk side muscle inside of the vehicle turning direction, thereby improving the lateral stiffness. Accordingly, even without depending on the large side support, the driver can withstand the lateral force acting outward in the vehicle turning direction. Therefore, it is possible to obtain the lightweight and compact seat.

In addition, since during every steering operation, the hips of the driver are moved by the rotation of the seat unit 7 using the seat unit rotation drive device 32, and the driver performs the movement of the waist for bending the lumbar spine by using the trunk muscle, the driver can perform the movement of the waist even during the driving of the vehicle. Since this suppresses the trunk muscle from being weakened, it is possible to suppress diseases such as backache due to the weakened trunk muscle. In addition, since blood circulation is promoted around the waist, it is possible to suppress the diseases such as weakened viscera function due to poor blood circulation around the waist. For these reasons, it is possible to achieve health promotion by driving the vehicle.

In addition, it is possible to move the right side and the left side of the hips of the driver relatively in the vertical direction of the vehicle seat apparatus 31 by moving the seat backrest 8 using the seat backrest rotation drive device 33. This can induce the driver to adopt the posture capable of performing the comfortable steering operation or the posture excellent in the posture retention during the turning. Therefore, it is possible to further improve the posture retention of the driver.

That is, when the driver performs the steering operation in order to turn the vehicle, it is possible to move the inside of the hip in the vehicle turning direction relatively upward in the vertical direction of the vehicle seat apparatus 31 with respect to the outside of the hip in the vehicle turning direction by moving the seat backrest 8 using the seat backrest rotation drive device 33. This motion allows the hips and the shoulders of the driver to have an optimum motion when viewed from the law of conservation of angular momentum, thereby further improving the steering operability of the driver.

In addition, the rotation axis of the hips according to the seat unit rotation drive device 32 is set so that the rear side is higher than the front side in the longitudinal direction of the vehicle seat apparatus 31, and thus bending of the lumbar spine or twisting of the lumbar spine is facilitated. Accordingly, it is possible to further improve the steering operability of the driver.

In addition, it is possible to further facilitate the bending of the lumbar spine or the twisting of the lumbar spine by allowing the rotation axis of the hips to pass near the waist of the driver sitting on the vehicle seat apparatus 31. Accordingly, it is possible to further improve the steering operability of the driver.

Hitherto, preferred embodiments of the present invention have been described, but the present invention is not limited to the above-described embodiments. For example, in the above-described embodiments, a case has been described where both of the seat unit 7 and the seat backrest 8 are rotated, but one only may be rotated. For example, the seat unit 7 only may be rotated and the seat backrest 8 may not be rotated.

In addition, in the above-described embodiments, a case has been described where the seat unit supporting mechanism and the seat backrest supporting mechanism are configured to have the thrust bearing and the thrust shaft, and the seat unit and the seat backrest are cantilevered by the seat unit supporting mechanism and the seat backrest supporting mechanism. However, if the seat unit and the seat backrest can be rotatably supported, any means may be employed as a configuration of the seat unit supporting mechanism and the seat backrest supporting mechanism or a supporting structure of the seat unit and the seat backrest.

In addition, in the above-described embodiments, a case has been described where the seat unit supporting mechanism and the seat backrest supporting mechanism are attached to the seat frame, but the seat unit supporting mechanism and the seat backrest supporting mechanism may be attached to any place. For example, the seat unit supporting mechanism and the seat backrest supporting mechanism may be directly attached to a floor of a vehicle.

In addition, in the above-described embodiments, a case has been described where since the longitudinal direction and the horizontal direction of the vehicle and the longitudinal direction and the horizontal direction of the vehicle seat apparatus are the same as each other, the seat unit and the seat backrest are rotated in the roll direction and the yaw direction of the vehicle. However, a rotation direction of the vehicle seat apparatus with respect to the vehicle is changed depending on arrangement of the vehicle seat apparatus with respect to the vehicle. For example, if the vehicle seat apparatus is arranged so as to face a vehicle width direction of a vehicle, the longitudinal direction of the vehicle seat apparatus becomes the lateral direction of the vehicle, and the lateral direction of the vehicle seat apparatus becomes the longitudinal direction of the vehicle. In this case, the right side and the left side of the seat unit and the seat backrest can be moved in the vertical direction of the vehicle seat apparatus by rotating the seat unit and the seat backrest in a pitch direction of the vehicle. The right side and the left side of the seat unit and the seat backrest can be moved in the longitudinal direction of the vehicle seat apparatus by rotating the seat unit and the seat backrest in the yaw direction of the vehicle.

In addition, a case has been described where the relative movement of the right side and the left side of the seat unit and seat backrest is performed by the rotation of the seat unit and seat backrest. However, if the right side and the left side of the seat unit and seat backrest can be relatively moved, any means may be employed. For example, the seat unit and the seat backrest may be divided into the right side and the left side, and the right side and the left side of the seat unit and the seat backrest which are divided may be supported so as to be movable respectively in the vertical direction and the longitudinal direction of the vehicle seat apparatus. In this way, without rotating the seat unit and the seat backrest, the right side and the left side of the seat unit and the seat backrest can be moved relatively in the vertical direction and the longitudinal direction of the vehicle seat apparatus.

In addition, the first to third embodiments can be appropriately combined with each other. For example, among the configurations described as the second embodiment, the configuration where the seat backrest is rotated in the yaw direction of the vehicle may be applied to the third embodiment. In this case, the seat backrest rotation drive device 33 and the ECU 34 function as the seat backrest moving means.

INDUSTRIAL APPLICABILITY

The present invention can be used as a vehicle seat apparatus installed in a vehicle.

REFERENCE SIGNS LIST

1. vehicle seat apparatus, 2. Rail, 3. seat frame, 4. first seat frame, 4a. seat unit supporting mechanism attachment unit, 5. second seat frame, 6. headrest, 7. seat unit, 8. seat backrest, 9. seat unit supporting mechanism (seat unit supporting means, distance changing means, seat unit rotating means), 10. thrust bearing, 11. thrust shaft, 12. seat backrest supporting mechanism (seat backrest supporting means, distance changing means, seat backrest rotating means), 13. thrust bearing, 14. thrust shaft, 15. slide rail, 21. vehicle seat apparatus, 22. seat backrest supporting mechanism, 23. thrust bearing, 24. thrust shaft, 31. vehicle seat apparatus, 32. seat unit rotation drive device (seat unit moving means, distance changing means, seat unit rotating means), 33. seat backrest rotation drive device (seat backrest moving means, distance changing means, seat backrest rotating means), 34. ECU 9 (seat unit moving means, seat backrest moving means, distance changing means, seat unit rotating means, seat backrest rotating means), A. rotation axis of seat unit, B. rotation axis of seat backrest, C. rotation axis of seat backrest, F. floor, V. vertical line, $\theta 1$. tilting angle with respect to vertical line of rotation axis A, $\theta 2$. tilting angle with respect to vertical line of rotation axis C

The invention claimed is:

1. A vehicle seat apparatus comprising:
   a seat unit;
   a seat backrest arranged on a rear side of the seat unit; and
   a seat unit supporting unit that supports the seat unit so that a right side and a left side of the seat unit are relatively movable in a vertical direction of the vehicle seat apparatus;
   wherein a rotation axis of the seat unit using the seat unit supporting unit is set so that a rear side is higher than a front side in the longitudinal direction of the vehicle seat apparatus.

2. The vehicle seat apparatus according to claim 1, wherein the seat unit supporting unit rotatably supports the seat unit in a roll direction of a vehicle.

3. The vehicle seat apparatus according to claim 1, wherein the seat unit supporting unit supports the seat unit so that the right side and the left side of the seat unit move relatively in a longitudinal direction of the vehicle seat apparatus.

4. The vehicle seat apparatus according to claim 3, wherein the seat unit supporting unit rotatably supports the seat unit in a yaw direction of the vehicle.

5. The vehicle seat apparatus according to claim 1, wherein the rotation axis of the seat unit using the seat unit supporting unit passes near a waist of an occupant.

6. The vehicle seat apparatus according to claim 1, further comprising:
a seat backrest supporting unit that supports the seat backrest so that the right side and the left side of the seat backrest move relatively in the vertical direction of the vehicle seat apparatus.

7. The vehicle seat apparatus according to claim 6,
wherein the seat backrest supporting unit rotatably supports the seat backrest in the roll direction of the vehicle.

8. The vehicle seat apparatus according to claim 6,
wherein the seat backrest supporting unit supports the seat backrest so that the right side and the left side of the seat backrest move relatively in the longitudinal direction of the vehicle seat apparatus, and
wherein the vehicle seat apparatus further comprises a movement direction regulating unit that rotates the seat unit and the seat backrest in opposite directions in a top view.

9. The vehicle seat apparatus according to claim 8,
wherein the seat backrest supporting unit rotatably supports the seat backrest in the yaw direction of the vehicle.

10. The vehicle seat apparatus according to claim 6,
wherein the rotation axis of the seat backrest using the seat backrest supporting unit passes near a chest of the occupant.

11. A vehicle seat apparatus comprising:
a seat unit;
a seat backrest arranged on a rear side of the seat unit;
a seat unit supporting unit that supports the seat unit so that a right side and a left side of the seat unit are relatively movable in a vertical direction of the vehicle seat apparatus; and
a seat unit moving unit that moves a side of the seat unit in the same direction as a turning direction of a vehicle relatively upward in the vertical direction of the vehicle seat apparatus with respect to the side of the seat unit in the direction opposite as a turning direction of a vehicle;
wherein a rotation axis of the seat unit using the seat unit supporting unit set so that rear side is higher than a front side in the longitudinal direction of the vehicle seat apparatus.

12. The vehicle seat apparatus according to claim 11,
wherein the seat unit moving unit moves the side of the seat unit in the same direction as the turning direction of the vehicle relatively forward in the longitudinal direction of the vehicle seat apparatus with respect to the side of the seat unit in the direction opposite as the turning direction of the vehicle.

13. The vehicle seat apparatus according to claim 11, further comprising:
a seat backrest moving unit that moves the side of the seat backrest in the same direction as the turning direction of the vehicle relatively downward in the vertical direction of the vehicle seat apparatus with respect to the side of the seat backrest in the direction opposite as the turning direction of the vehicle.

14. The vehicle seat apparatus according to claim 11,
wherein the seat backrest moving unit moves the side of the seat backrest in the same direction as the turning direction of the vehicle relatively rearward in the longitudinal direction of the vehicle seat apparatus with respect to the side of the seat backrest in the direction opposite as the turning direction of the vehicle, and
wherein the vehicle seat apparatus further comprises a movement direction regulating unit that moves the seat unit and the seat backrest in the opposite directions in the longitudinal direction of the vehicle seat apparatus.

15. The vehicle seat apparatus according to claim 11,
wherein the rotation axis of the seat unit passes near a waist of an occupant.

16. A vehicle seat apparatus comprising:
a seat unit;
a seat backrest arranged on a rear side of the seat unit;
a seat unit supporting unit that supports the seat unit so that a right side and a left side of the seat unit are relatively movable in a vertical direction of the vehicle seat apparatus; and
distance changing unit that changes a distance between the seat unit and the seat backrest on one side in a lateral direction of the vehicle seat apparatus;
wherein a rotation axis of the seat unit using the seat unit supporting unit is set so that a rear side is higher than a front side in the longitudinal direction of the vehicle sea apparatus.

17. A vehicle seat apparatus comprising:
a seat unit;
a seat backrest arranged on a rear side of the seat unit;
a seat unit supporting unit that supports the seat unit so that a right side and a left side of the seat unit are relatively movable in a vertical direction of the vehicle seat apparatus;
a seat unit rotating unit that rotates the seat unit in a top view of the vehicle seat apparatus; and
a seat backrest rotating unit that rotates the seat backrest in the top view of the vehicle seat apparatus,
wherein the seat unit rotating unit and the seat backrest rotating unit rotate the seat unit and the seat backrest in opposite directions in the top view;
wherein a rotation axis of the seat unit using the seat unit supporting unit is set so that a rear side is higher than a front side in the longitudinal direction of the vehicle seat apparatus.

* * * * *